United States Patent
Maruyama et al.

(10) Patent No.: US 6,741,798 B2
(45) Date of Patent: *May 25, 2004

(54) INFORMATION RECORDING MEDIUM, METHOD FOR RECORDING INFORMATION, AND METHOD FOR REPRODUCTION INFORMATION

(75) Inventors: Koji Maruyama, Yokohama (JP); Yoshiyuki Ishizawa, Yokohama (JP); Hideo Ando, Tokyo (JP); Shinichi Kikuchi, Yokohama (JP); Kazuhiko Taira, Yokohama (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 0 days.

This patent is subject to a terminal disclaimer.

(21) Appl. No.: 10/175,407

(22) Filed: Jun. 20, 2002

(65) Prior Publication Data

US 2002/0159765 A1 Oct. 31, 2002

Related U.S. Application Data

(62) Division of application No. 10/125,599, filed on Apr. 19, 2002, now Pat. No. 6,532,336, which is a division of application No. 09/233,027, filed on Jan. 20, 1999, now Pat. No. 6,385,389.

(30) Foreign Application Priority Data

Jan. 21, 1998 (JP) .......................... 10-009903

(51) Int. Cl.⁷ ................................ H04N 5/91
(52) U.S. Cl. ................. 386/95; 386/120; 386/125; 386/126
(58) Field of Search ................. 386/95, 111, 112, 386/125, 126, 83, 97, 120, 121

(56) References Cited

U.S. PATENT DOCUMENTS

| | | | |
|---|---|---|---|
| 5,546,191 A | 8/1996 | Hibi et al. | |
| 5,576,950 A | 11/1996 | Tonomura et al. | |
| 5,701,385 A | * 12/1997 | Katsuyama et al. | ........ 386/126 |
| 5,778,142 A | * 7/1998 | Taira et al. | ........ 386/97 |
| 5,819,004 A | * 10/1998 | Azadegan et al. | ........ 386/125 |
| 5,966,352 A | 10/1999 | Sawabe et al. | |
| 6,006,007 A | 12/1999 | Honjo | |
| 6,148,138 A | 11/2000 | Sawabe et al. | |
| 6,246,401 B1 | * 6/2001 | Setogawa et al. | ........ 386/83 |
| 6,275,451 B1 | * 8/2001 | Park et al. | ........ 386/95 |

FOREIGN PATENT DOCUMENTS

| | | |
|---|---|---|
| JP | 64-66839 | 3/1989 |
| JP | 64-066839 | 3/1989 |
| JP | 03-183091 | 8/1991 |
| JP | 3-183091 | 8/1991 |
| JP | 7-250300 | 9/1995 |
| JP | 9-259573 | 10/1997 |

* cited by examiner

*Primary Examiner*—Huy Nguyen
(74) *Attorney, Agent, or Firm*—Oblon, Spivak, McClelland, Maier & Neustadt, P.C.

(57) ABSTRACT

An information recording medium includes a first area (DA2) for storing picture data for forming a plurality of pictures, a second area (DA21) which is included in the first area and stores control data of the picture data, and a third area (INFO1) which is included in the second area and stores specifying data for specifying the storage position of representative picture data for forming a representative picture in the plurality of pictures.

5 Claims, 25 Drawing Sheets

VIDEO MANAGER INFORMATION MANAGEMENT TABLE VMGI_MAT

| RBP | SYMBOL | CONTENTS | NUMBER OF BYTES |
|---|---|---|---|
| 0-11 | VMG_ID | VMG IDENTIFIER | 12 |
| 12-15 | VMG_EA | END ADDRESS OF VMG | 4 |
| 16-27 | RESERVED | RESERVED | 12 |
| 28-31 | VMGI_EA | END ADDRESS OF VMGI | 4 |
| 32-33 | VERN | VERSION OF DVD SPEC. | 2 |
| 34-37 | VMG_CAT | VIDEO MANAGER CATEGORY | 4 |
| 38-45 | VLMS_ID | VOLUME SET IDENTIFIER | 8 |
| 46-49 | FREE_SPACE | FREE SPACE/FREE AREA | 14 |
| 50-61 | RESERVED | RESERVED | 12 |
| 62-63 | VTS_Ns | NUMBER OF VTS | 2 |
| 64-95 | PVR_ID | PROVIDER UNIQUE ID | 32 |
| 96-127 | RESERVED | RESERVED | 32 |
| 128-131 | VMGI_MAT_EA | VMGI_MAT END ADDRESS | 4 |
| 132-135 | FP_PGCI_SA | FP_PGCI START ADDRESS | 4 |
| 136-191 | RESERVED | RESERVED | 56 |
| 192-195 | VMGM_VOBS_SA | VMGM_VOBS START ADDRESS | 4 |
| 196-199 | TT_SRPT_SA | TT_SRPT START ADDRESS | 4 |
| 200-203 | VMGM_PGCI_UT_SA | VMGM_PGCI_UT START ADDRESS | 4 |
| 204-207 | PTL_MAIT_SA | PTL_MAIT START ADDRESS | 4 |
| 208-211 | VTS_ATRT_SA | VTS_ATRT START ADDRESS | 4 |
| 212-215 | TXTDT_MG_SA | TXTDT_MG START ADDRESS | 4 |
| 216-219 | VMGM_C_ADT_SA | VMGM_C_ADT START ADDRESS | 4 |
| 220-223 | VMGM_VOBU_ADMAP_SA | VMGM_VOBU_ADMAP START ADDRESS | 4 |
| 224-255 | RESERVED | RESERVED | 32 |
| 256-257 | VMGM_V_ATR | VIDEO ATTRIBUTE OF VMGM | 2 |
| 258-259 | VMGM_AST_Ns | NUMBER OF AUDIO STREAMS OF VMGM | 2 |
| 260-267 | VMGM_AST-ATR | AUDIO STREAM ATTRIBUTE OF VMGM | 8 |
| 268-323 | RESERVED | RESERVED | 56 |
| 324-339 | RESERVED | RESERVED | 16 |
| 340-341 | VMGM_SPST_Ns | NUMBER OF SUB-PICTURE STREAMS OF VMGM | 2 |
| 342-347 | VMGM_SPST_ATR | SUB-PICTURE STREAM ATTRIBUTE OF VMGM | 6 |
| 348-1023 | RESERVED | RESERVED | 676 |
| 1024-2291 (MAX) | FP_PGCI | FIRST PLAY PGCI | 0 OR 236-268 |

FIG. 15

VIDEO TITLE SET INFORMATION MANAGEMENT TABLE VTSI_MAT

| RBP | SYMBOL | CONTENTS | NUMBER OF BYTES |
|---|---|---|---|
| 0-11 | VTS_ID | VTS IDENTIFIER | 12 |
| 12-15 | VTS_EA | END ADDRESS OF VTS | 4 |
| 16 | PLAY_END Flag | 0=NOT YET PLAYED BACK; 1=COMPLETELY PLAYED BACK | 1 |
| 17 | ARCHIVE Flag | 0=FREE (ERASABLE); 1=KEEP (UNERASABLE) | 1 |
| 18-27 | RESERVED | RESERVED | 10 |
| 28-31 | VTSI_EA | END ADDRESS OF VTSI | 4 |
| 32-33 | VERN | VERSION OF DVD SPEC. | 2 |
| 34-37 | VTS_CAT | VTS CATEGORY | 4 |
| 38-127 | RESERVED | RESERVED | 90 |
| 128-131 | VTSI_MAT_EA | END ADDRESS OF VTSI_MAT | 4 |
| 132-191 | RESERVED | RESERVED | 60 |
| 192-195 | VTSM_VOBS_SA | START ADDRESS OF VTSM_VOBS | 4 |
| 196-199 | VTSTT_VOBS_SA | START ADDRESS OF VTSTT_VOBS | 4 |
| 200-203 | VTS_PTT_SRPT_SA | START ADDRESS OF VTS_PTT_SRPT | 4 |
| 204-207 | VTS_PGCIT_SA | START ADDRESS OF VTS_PGCIT | 4 |
| 208-211 | VTSM_PGCI_UT_SA | START ADDRESS OF VTSM_PGCI_UT | 4 |
| 212-215 | VTS_TMAPT_SA | START ADDRESS OF VTS_TMAPT | 4 |
| 216-219 | VTSM_C_ADT_SA | START ADDRESS OF VTSM_C_ADT | 4 |
| 220-223 | VTSM_VOBU_ADMAP_SA | START ADDRESS OF VTSM_VOBU_ADMAP | 4 |
| 224-227 | VTS_C_ADT_SA | START ADDRESS OF VTS_C_ADT | 4 |
| 228-231 | VTS_VOBU_ADMAP_SA | START ADDRESS OF VTS_VOBU_ADMAP | 4 |
| 232-255 | RESERVED | RESERVED | 24 |
| 256-579 |  | ATTRIBUTES OF VIDEO, AUDIO, SUP-PICTURE, ETC. | 324 |
| 580-595 | RESERVED | RESERVED | 16 |
| 596-597 | VTS_SPST_Ns | NUMBER OF SUB-PICTURE STREAMS OF VTS | 2 |
| 598-789 | VTS_SPST_ATRT | SUB-PICTURE STREAM ATTRIBUTE TABLE OF VTS | 192 |
| 790-791 | RESERVED | RESERVED | 2 |
| 792-983 | VTS_MU_AST_ATRT | MULTICHANNEL AUDIO STREAM ATTRIBUTE TABLE OF VTS | 192 |
| 984-2047 | RESERVED | RESERVED | 1064 |

FIG. 17

PROGRAM CHAIN GENERAL INFORMATION PGC_GI

| RBP | SYMBOL | CONTENTS | NUMBER OF BYTES |
|---|---|---|---|
| 0-3 | PGC_CNT | PGC CONTENTS | 4 |
| 4-7 | PGC_PB_TM | PGC PLAYBACK TIME | 4 |
| 8-11 | PGC_UOP_CTL | PGC USER OPERATION CONTROL | 4 |
| 12-27 | PGC_AST_CTLT | PGC AUDIO STREAM CONTROL TABLE | 16 |
| 28-155 | PGC_SPST_CTLT | PGC SUB-PICTURE STREAM CONTROL TABLE | 128 |
| 156-163 | PGC_NV_CTL | PGC NAVIGATION CONTROL | 8 |
| 164-227 | PGC_SP_PLT | PGC SUB-PICTURE PALETTE | 4×16 |
| 228-229 | PGC_CMDT_SA | START ADDRESS OF PGC_CMDT | 2 |
| 230-231 | PGC_PGMAP_SA | START ADDRESS OF PGC_PGMAP | 2 |
| 232-233 | C_PBIT_SA | START ADDRESS OF C_PBIT | 2 |
| 234-235 | C_POSIT_SA | START ADDRESS OF C_POSIT | 2 |

TOTAL 236 BYTES

FIG. 18

| AV FILE 1401 ||||||
|---|---|---|---|---|---|
| VOB #3 1463 | VOB #1 1461 | VOB #3 1464 | VOB #2 1462 | UN-RECORDED AREA 1460 | VOB #3 1465 |
| EXTENT #γ 1473 | EXTENT #α 1471 | EXTENT #δ 1474 | EXTENT #β 1472 | EXTENT #ζ 1470 | EXTENT #ε 1475 |
| LSN a+1, LSN a+2, ..., LSN b | LSN b+1, LSN b+2, ..., LSN c | LSN c+1, ..., LSN d | LSN d+1, ..., LSN e | LSN e+1, ..., LSN f | LSN f+1, ..., LSN g |

← LSN (LOGICAL SECTOR NUMBER) SMALL       LSN LARGE →
(TOWARD INNER SIDE ON                      (TOWARD OUTER SIDE
OPTICAL DISK 1001)                          ON OPTICAL DISK 1001)

| | | |
|---|---|---|
| NUMBER OF EXTENTS IN UNRECORDED AREA | 1601 | 1 |
| START ADDRESS OF FIRST EXTENT IN UNRECORDED AREA (LOGICAL SECTOR NUMBER) | 1606 | e-a |
| SIZE OF FIRST EXTENT IN UNRECORDED AREA (SECTOR NUMBER) | 1614 | f-e |
| NUMBER OF EXTENTS INCLUDED IN VOB#1 | 1602 | 1 |
| START ADDRESS OF FIRST EXTENT IN VOB#1 (LOGICAL SECTOR NUMBER) | 1607 | b-a |
| SIZE OF FIRST EXTENT IN VOB#1 | 1615 | c-b |
| NUMBER OF EXTENTS INCLUDED IN VOB#2 | 1603 | 1 |
| START ADDRESS OF FIRST EXTENT IN VOB#2 (LOGICAL SECTOR NUMBER) | 1608 | d-a |
| SIZE OF FIRST EXTENT IN VOB#2 | 1616 | e-d |
| NUMBER OF EXTENTS INCLUDED IN VOB#3 | 1604 | 3 |
| START ADDRESS OF FIRST EXTENT IN VOB#3 (LOGICAL SECTOR NUMBER) | 1609 | 1 |
| SIZE OF FIRST EXTENT IN VOB#3 | 1617 | b-a |
| START ADDRESS OF SECOND EXTENT IN VOB#3 (LOGICAL SECTOR NUMBER) | 1610 | c-a |
| SIZE OF SECOND EXTENT IN VOB#3 | 1618 | d-c |
| START ADDRESS OF THIRD EXTENT IN VOB#3 (LOGICAL SECTOR NUMBER) | 1611 | f-a |
| SIZE OF THIRD EXTENT IN VOB#3 | 1619 | g-f |

| |
|---|
| UNRECORDED AREA POSITION DISTRIBUTION INFORMATION 1621 |
| DATA RECORDING POSITION DISTRIBUTION INFORMATION ABOUT VOB#1 1622 |
| DATA RECORDING POSITION DISTRIBUTION INFORMATION ABOUT VOB#2 1623 |
| DATA RECORDING POSITION DISTRIBUTION INFORMATION ABOUT VOB#3 1624 |

FIG. 29

| | RTRW Video Manager Information (RTRW_VMGI) | | Video Manager Information Management Table (VMGI_MAT) |
|---|---|---|---|
| | 1021 | | Play List Pointer Table (PL_LPT) |

| RBP | Field Name | Contents | Number of bytes |
|---|---|---|---|
| 0 to 11 | VMG_ID | VMG Identifier | 12 bytes |
| 12 to 15 | RTR_VMG_EA | End address of RTR_VMG | 4 bytes |
| 16 to 27 | reserved | reserved | 12 bytes |
| 28 to 31 | VMGI_EA | End address of VMGI | 4 bytes |
| 32 to 33 | VERN | Version number of DVD Specifications for Video Recording | 2 bytes |
| 34 to 127 | reserved | reserved | 94 bytes |
| 128 to 129 | TM_ZONE | Time Zone | 2 bytes |
| 130 to 131 | STILL_TM | Still Time for Still Pictures | 2 bytes |
| 132 to 133 | CHRS | Character Set Code for Primary Text | 2 bytes |
| 134 to 148 | RSM_MRKI | Resume Marker Information | 15 bytes |
| 149 to 163 | REP_PICTI | Disc Representative Picture Information | 15 bytes |
| 164 to 191 | reserved | reserved | 28 bytes |
| 192 to 195 | M_AVFIT_SA | Start Address of M_AVFIT | 4 bytes |
| 196 to 199 | S_AVFIT_SA | Start Address of S_AVFIT | 4 bytes |
| 200 to 207 | reserved | reserved | 8 bytes |
| 208 to 211 | ORG_PGCI_SA | Start Address of ORG_PGCI | 4 bytes |
| 212 to 215 | UD_PGCIT_SA | Start Address of UD_PGCI | 4 bytes |
| 216 to 219 | TXTDT_MG_SA | Start Address of TXTDT_MG | 4 bytes |
| 220 to 223 | MNFIT_SA | Start Address of MNFIT | 4 bytes |
| 224 to 511 | reserved | reserved | 288 bytes |
| Total | | | 512 bytes |

| RBP | Field Name | Contents | Number of bytes |
|---|---|---|---|
| 149 | PGCN | PGC number | 1 byte |
| 150 | PGN | PG number | 1 byte |
| 151 to 152 | CN | Cell number | 2 bytes |
| 153 to 158 | PICT_PT | Picture Point | 6 bytes |
| 159 to 163 | CREAT_TM | Time when this Disc Representative Picture was made | 5 bytes |
| Total | | | 15 bytes |

FIG. 30

INFORMATION RECORDING MEDIUM, METHOD FOR RECORDING INFORMATION, AND METHOD FOR REPRODUCTION INFORMATION

CROSS-REFERENCE TO RELATED APPLICATIONS

The present application is a divisional of parent U.S. application Ser. No. 10/125,599, filed on Apr. 19, 2002, U.S. Pat. No. 6,532,336, filed on Jan. 20, 1999 which in turn is a divisional of grandparent U.S. application Ser. No. 09/233,027 filed on Jan. 20, 1999, now U.S. Pat. No. 6,385,389, the entire contents of each of which are hereby incorporated herein by reference.

BACKGROUND OF THE INVENTION

The present invention relates to an information recording medium such as a DVD (Digital Video Disk)-RAM (Random Access Memory) for recording predetermined information.

The present invention also relates to an information recording method for recording information on an information recording medium such as a DVD-RAM for recording predetermined information.

The present invention further relates to an information playback method for playing back information recorded on an information recording medium such as a DVD-RAM for recording predetermined information.

In recent years, systems for playing back the contents of optical discs that record video data (moving pictures), audio data, and the like have been developed, and have prevailed for the purpose of playing back movie software titles, karaoke data, and the like as in LDs (laser discs), video CDs (video compact discs), and the like. Information about recording contents such as titles is generally printed on the surfaces of such optical discs. Further, information about recording contents such as titles is generally added to the packages of these optical discs. This allows the user to obtain the recording contents of an optical disc without playing back the optical disc.

DVD standards that use MPEG2 (moving picture expert group) international standards, and also use an audio compression scheme such as AC-3 (digital audio compression), or the like, have been proposed. The DVD standards include read-only DVD video (or DVD-ROM), write-once DVD-R, and recordable/readable DVD-RW (or DVD-RAM).

The DVD video (DVD-ROM) standards support MPEG2 as a moving picture compression scheme, and AC-3 audio and MPEG audio in addition to linear PCM as audio recording schemes in accordance with the MPEG2 system layer. Furthermore, the DVD video standards are configured by adding sub-picture data obtained by runlength-compressing bitmap data for superimposed dialogs, and presentation control data (navigation data) for fastforward, rewind, data search, and the like. The standards also support the UDF Bridge format (a hybrid of UDF and ISO9660) to allow computers to read data.

An optical disc currently used in DVD video (DVD-ROM) is a single-sided, single-layered 12 cm disc having a storage amount around 4.7 GB (gigabytes). A single-sided, two-layered disc has a storage amount around 9.5 GB, and a double-sided, two-layered disc is capable of recording a large amount of data around 18 GB (when a laser of a wavelength of 650 nm is used for reading).

An optical disc currently used in DVD-RW (DVD-RAM) is a 12 cm disc, and has a storage amount of 2.6 GB (gigabytes) on one surface, i.e., 5.2 GB on the two surfaces. The currently available DVD-RAM optical disc has a smaller storage amount than that of a DVD-ROM disc of the corresponding size. However, technical developments for expanding the amount of the DVD-RAM disc have been extensively made, and it is certain that a DVD-RAM disc having a storage amount more than 4.7 GB on one surface will be available in the near future.

However, since an MPEG2 video file that can obtain high picture quality has a large data size, the currently available DVD-RAM disc (single-sided 2.6 GB disc or double-sided 5.2 GB disc) does not always have a sufficient recordable time (around 1 hour for 2.6 GB disc, around 2 hours for 5.2 GB disc).

Since the user can freely record data on the DVD-RAM disc, no information representing recording contents is generally printed on the disc surface. For the same reason, no information representing recording contents is generally printed on the package of the DVD-RAM disc.

To obtain the recording contents of the DVD-RAM disc at a glance at the disc appearance, the user must perform the following process. For example, the user grasps recording contents recorded on the DVD-RAM disc. The user creates information representing the recording contents of the DVD-RAM disc. The user writes the information representing the recording contents of the DVD-RAM disc on the disc surface. Alternatively, the user may add information representing the recording contents of the DVD-RAM disc to the disc package.

Since no information about recording contents is printed on the DVD-RAM disc, as described above, the user cannot obtain the recording contents of the optical disc at a glance at the disc appearance.

To obtain the recording contents of the optical disc at a glance at the appearance of the DVD-RAM disc, the user must perform predetermined processing for the disc.

BRIEF SUMMARY OF THE INVENTION

The present invention has been made to solve the above problems, and has as its object to provide the following information recording medium, information recording method, and information playback method.

(1) There is provided an information recording medium which can contribute to easy display of information about the recording contents of the information recording medium without any playback and cumbersome processing of the information recording medium (DVD-RAM disc).

(2) There are provided an information recording method and information playback method which can easily display information about the recording contents of an information recording medium without any playback and cumbersome processing of the information recording medium.

To achieve the above objects, the information recording medium, information recording method, and information playback method according to the present invention have the following arrangements.

(1) The information recording medium according to the present invention comprises a first area for storing picture data for forming a plurality of pictures, a second area which is included in the first area and stores control data of the picture data, and a third area which is included in the second area and stores specifying data for specifying a storage position of representative picture data for forming a representative picture in the picture data.

(2) The information recording method according to the present invention comprises the first step of playing back an information recording medium having a first area for storing picture data for forming a plurality of pictures, a second area which is included in the first area and stores control data of the picture data, and a third area which is included in the second area and stores specifying data for specifying a storage position of representative picture data for forming a representative picture in the picture data, and the second step of obtaining the representative picture data on the basis of the specifying data obtained by playback in the first step, and printing out the representative picture based on the obtained representative picture data.

(3) The information playback method according to the present invention comprises the first step of playing back an information recording medium having a first area for storing picture data for forming a plurality of pictures, a second area which is included in the first area and stores control data of the picture data, and a third area which is included in the second area and stores specifying data for specifying a storage position of representative picture data for forming a representative picture in the plurality of pictures, and the second step of obtaining the representative picture data on the basis of the specifying data obtained by playback in the first step, and displaying the picture based on the obtained representative picture data.

BRIEF DESCRIPTION OF THE SEVERAL VIEWS OF THE DRAWING

FIG. 15 is a view for explaining the contents of video manager information management table VMGI_MAT in FIG. 14;

FIG. 17 is a view for explaining the contents of video title set information management table VTSI_MAT in FIG. 16;

FIG. 18 is a view for explaining the contents of program chain general information PGC_GI;

FIG. 29 is a view schematically showing a data structure in an allocation map table;

FIG. 30 is a view schematically showing example 1 of the data structure of RTRW video manager information;

DETAILED DESCRIPTION OF THE INVENTION

A digital information recording/playback system according to an embodiment of the present invention will be explained hereinafter with reference to the accompanying drawings.

As a typical embodiment of a digital information recording/playback system according to the present invention, an apparatus which records/plays back moving pictures encoded by MPEG2 at a variable bit rate, e.g., a DVD digital video recording, is known. (An example of the DVD digital video recorder will be described in detail layer).

Figure 1:
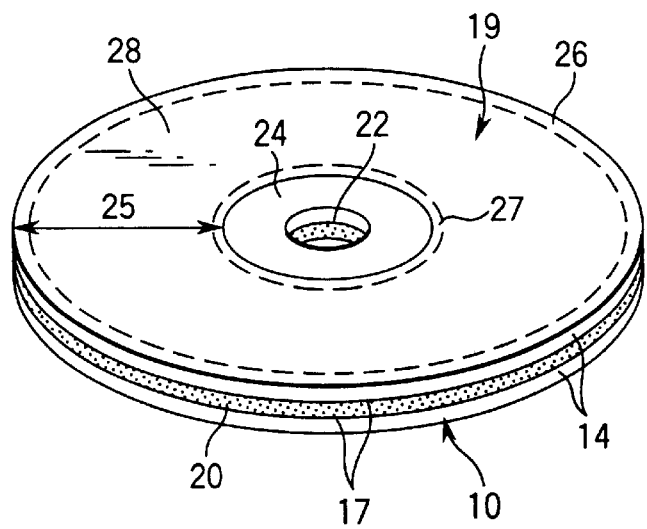
FIG. 1 is a perspective view for explaining the structure of a recordable/readable optical disc (DVD-RAM or DVD-RW disc)

FIG. 1 is a perspective view for explaining the structure of a recordable/readable optical disc 10 used in the DVD digital video recorder.

As shown in FIG. 1, this optical disc 10 has a structure obtained by adhering a pair of transparent substrates 14 each having recording layer 17 using adhesive layer 20. Each substrate 14 can be formed of a 0.6 mm thick polycarbonate film, and adhesive layer 20 can consist of a very thin (e.g., 40 μm thick) ultraviolet setting resin. When the pair of 0.6 mm thick substrates 14 are adhered to each other so that their recording layers 17 contact each other on the surfaces of adhesive layer 20, a 1.2 mm thick large-amount optical disc 10 is obtained.

Optical disc 10 has center hole 22, and clamp areas 24 used for clamping optical disc 10 upon its rotation are formed around center hole 22 on the two surfaces of the disc. Center hole 22 receives the spindle of a disc motor when optical disc 10 is loaded into a disc drive (not shown). Optical disc 10 is clamped at its clamp areas 24 by a disc damper (not shown).

Optical disc 10 has information areas 25 that can record video data, audio data, and other information around clamp areas 24 on its two surfaces.

Each information area 25 has lead-out area 26 on its outer periphery side, and lead-in area 27 on its inner periphery side that contacts clamp area 24. The area between lead-out and lead-in areas 26 and 27 is defined as data recording area 28.

On recording layer (optical reflection layer) 17 of information area 25, a recording track is continuously formed in, e.g., a spiral pattern. The continuous track is divided into a plurality of physical sectors, which have serial numbers. Various data are recorded on optical disc 10 using these sectors as recording units.

Data recording area 28 serves as an actual data recording area, and records video data (main picture data) such as a movie or the like, sub-picture data such as superimposed dialogs, menus, and the like, and audio data such as words, effect sounds, and the like as similar pit trains (physical shapes or phase states that bring about change in optical conditions).

When optical disc 10 is a double-sided recording RAM disc in which each surface has one recording layer, each recording layer 17 can be formed by three layers, i.e., by sandwiching a phase-change recording material layer (e.g., $Ge_2Sb_2Te_5$) between two zinc sulfide.silicon oxide ($ZnS.SiO_2$) mixture layers.

When optical disc 10 is a single-sided recording RAM disc in which each surface has one recording layer, recording layer 17 on the side of read-out surface 19 can be formed by three layers including the phase-change recording material layer. In this case, layer 17 on the side opposite to read-out surface 19 need not be an information recording layer but may merely be a dummy layer.

When optical disc 10 is a one-side read type two-layered RAM/ROM disc, two recording layers 17 can comprise a single phase-change recording layer (on the side farther from read-out surface 19; read/write), and a single semi-transparent metal reflection layer (on the side closer to read-out surface 19; read-only).

When optical disc 10 is a write-once DVD-R, a polycarbonate substrate is used, gold can be used as a reflection layer (not shown), and an ultraviolet setting resin can be used as a protection layer (not shown). In this case, an organic dye is used in recording layer 17. As the organic dyes, cyanine, squarilium, chroconic, and triphenylmenthane dyes, xanthene and quinone dyes (naphthoquinone, anthraquinone, and the like), metal complex dyes (phthalocyanine, porphyrin, dithiol complex, and the like), and so forth can be used.

Data can be written on such DVD-R disc using a semiconductor laser having a wavelength of 650 nm and an output of about 6 to 12 mW.

When optical disc 10 is a one-side read type two-layered ROM disc, two recording layers 17 can be comprised of a single metal reflection layer (on the side farther from read-out surface 19) and a single semi-transparent reflection layer (on the side closer to read-out surface 19).

In case of read-only DVD-ROM disc 10, pit trains are pre-formed by a stamper on substrate 14, and a reflection layer of, e.g., a metal, is formed on that surface of substrate 14, which is formed with pit trains. The reflection layer is used as recording layer 17. In such DVD-ROM disc 10, no grooves serving as recording tracks are especially formed, and the pit trains formed on the surface of substrate 14 serve as tracks.

In various types of optical discs 10 described above, read-only ROM information is recorded on recording layer 17 as an embossed pattern signal. By contrast, no such embossed pattern signal is formed on substrate 14 having read/write (or write-once) recording layer 17, and a continuous groove is formed instead. A phase-change recording layer is formed on such groove. In case of a read/write DVD-RAM disc, the phase-change recording layer in land portions is also used for information recording in addition to the groove.

When optical disc 10 is of one-side read type (independently of one or two recording layers), substrate 14 on the rear side viewed from read-out surface 19 need not always be transparent to the read/write laser beam used. In this case, a label may be printed on the entire surface of substrate 14 on the rear side.

A DVD digital video recorder (to be described later) can be designed to attain repetitive recording/repetitive playback (read/write) for a DVD-RAM disc (or DVD-RW disc), single recording/repetitive playback for a DVD-R disc, and repetitive playback for a DVD-ROM disc.

Figure 2A:
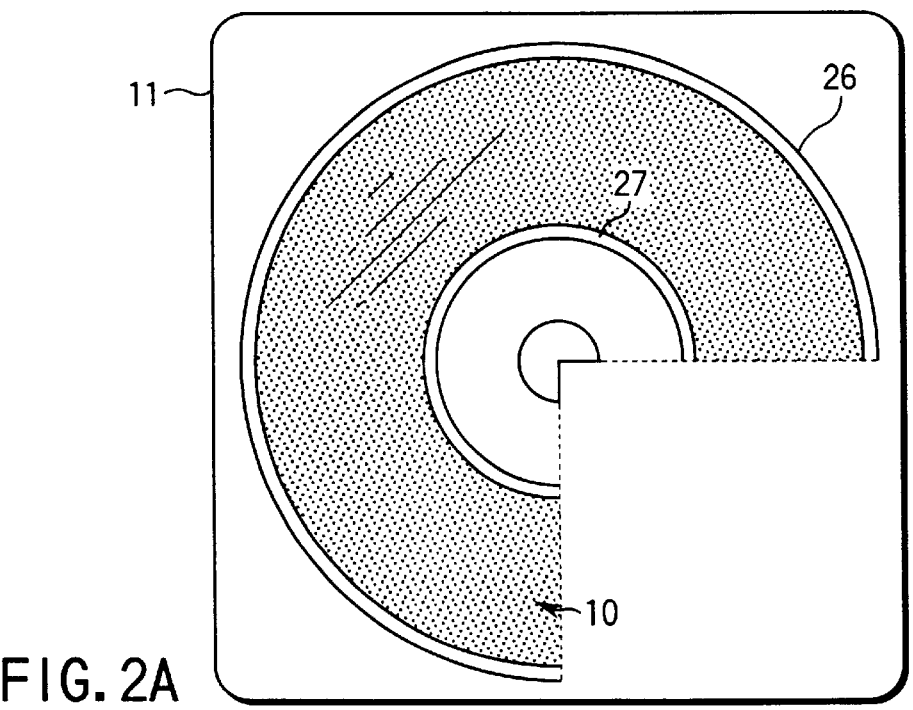
FIG. 2A is a view showing the state in which the optical disc shown in FIG. 1 is stored in a cartridge.
Figure 2B:
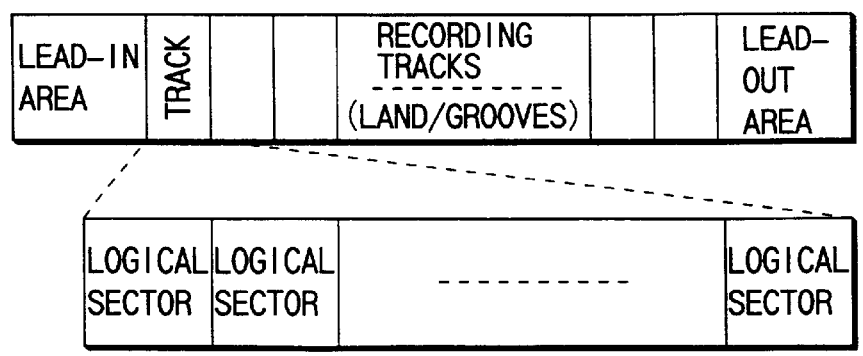
FIG. 2B is a view showing the schematic arrangement of recording tracks on the data recording area of the optical disc shown in FIG. 1.

FIG. 2A is a view showing the state in which the optical disc shown in FIG. 1 is stored in a cartridge. FIG. 2B is a view showing the schematic arrangement of recording tracks on the data recording area of the optical disc shown in FIG. 1.

When disc 10 is a DVD-RAM (or DVD-RW), disc 10 itself is stored in cartridge 11 to protect its delicate disc surface. When DVD-RAM disc 10 in cartridge 11 is inserted into the disc drive of a DVD video recorder (to be described later), the shutter of cartridge 11 opens, disc 10 is clamped by the turntable of a spindle motor (not shown) and rotated to face an optical head (not shown).

On the other hand, when disc 10 is a DVD-R or DVD-ROM, disc 10 itself is not stored in cartridge 11, and bare disc 10 is directly set on the disc tray of a disc drive.

Recording layer 17 of information area 25 shown in FIG. 1 is formed with a continuous data recording track in a spiral pattern. The continuous track is divided into a plurality of logical sectors (minimum recording units) each having a given storage amount, as shown in FIG. 2B, and data are recorded with reference to these logical sectors. The recording amount per logical sector is determined to be 2,048 bytes (or 2 kbytes) which are equal to one pack data length (to be described later).

Data recording area 28 is an actual data recording area, which similarly records management data, main picture (video) data, sub-picture data, and audio data.

Note that data recording area 28 of disc 10 shown in FIG. 2A can be divided into a plurality of ring-shaped (annular)

recording areas (a plurality of recording zones), although not shown. The disc rotational velocity varies in units of recording zones. However, within each zone, a constant linear or angular velocity can be set. In this case, an auxiliary recording area (free space or area) can be provided for each zone. These free spaces in units of zones may collectively form a reserve area for that disc 10.

FIG. 3 to FIG. 11 are views for explaining the hierarchical structure of information recorded on optical disc 10 shown in FIG. 1.

Figure 3:
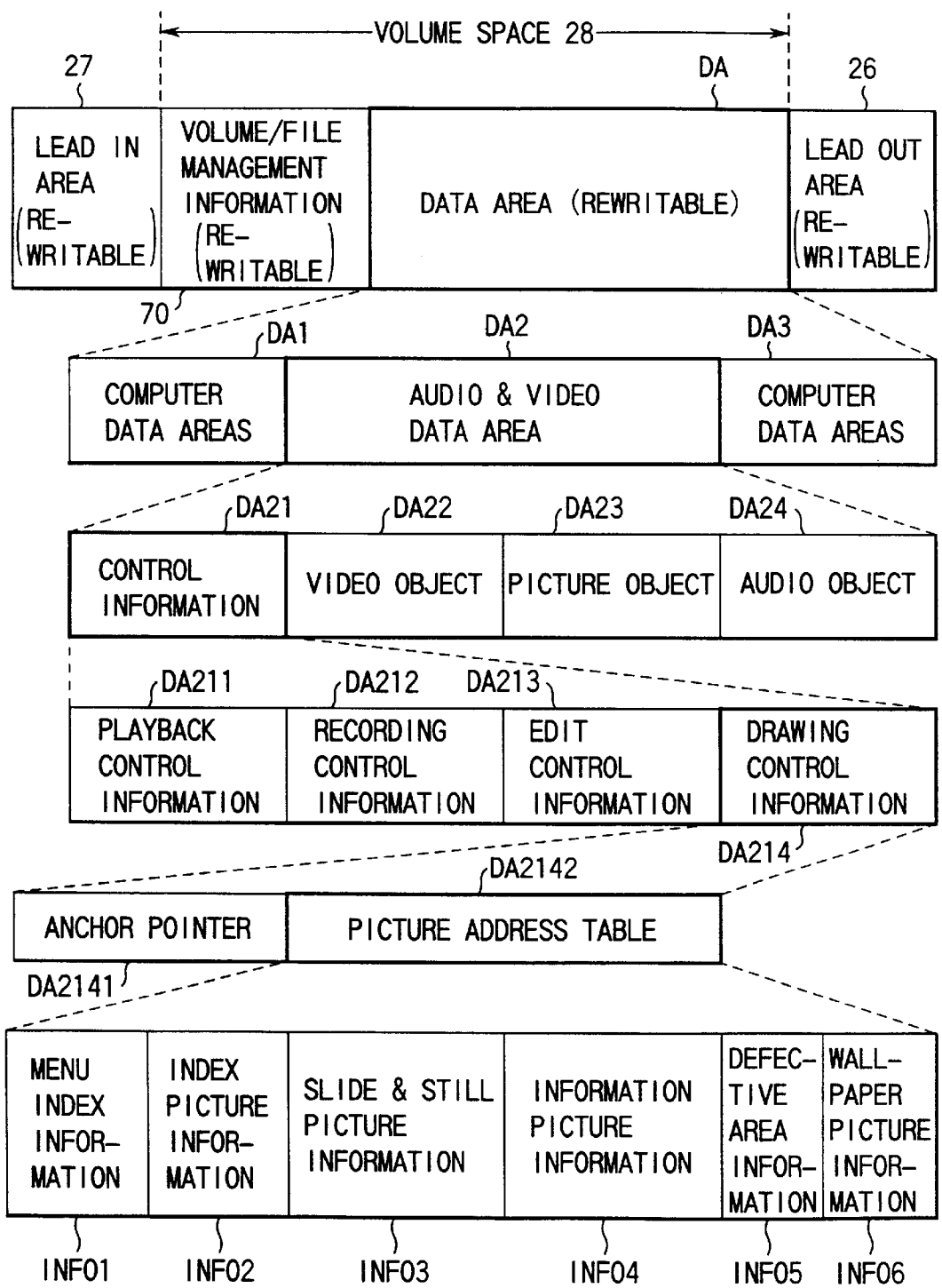
FIG. 3 is a view for explaining the hierarchical structure of information (the contents of the data recording area or a volume space of DVD video) recorded on the optical disc in FIG. 1.

Data recording area 28 formed on optical disc 10 shown in FIG. 1 has a structure, as shown in FIG. 3. The logical format of this structure is defined to comply with, e.g., the Universal Disk Format (UDF) Bridge (a hybrid of UDF and ISO9660) as one of standard formats.

Data recording area 28 between lead-in area 27 and lead-out area 26 is assigned as a volume space. Volume space 28 can include a space for information of the volume and file structures (volume/file management information 70), and a space for the application of the DVD format (data area (rewritable) DA).

Volume space 28 is physically divided into a large number of sectors, and these physical sectors have serial numbers. The logical addresses of data recorded on this volume space (data recording area) 28 mean logical sector numbers, as defined by ISO9660 and the UDF Bridge. The logical sector size in this space is 2,048 bytes (or 2 kybtes) as the effective data size of the physical sector. The logical sector numbers are assigned serial numbers in ascending order of physical sector numbers.

Unlike the logical sectors, each physical sector is added with redundant information such as error correction information and the like. For this reason, the physical sector size does not strictly match the logical sector size.

That is, volume space 28 has a hierarchical structure, which includes volume/file management information 70 and data area DA. These areas included in volume space 28 are split up on the boundaries of logical sectors. Note that one logical sector is defined to be 2,048 bytes, and one logical block is also defined to be 2,048 bytes. Hence, one logical sector is defined equivalently with one logical block.

Volume/file management information 70 corresponds to a management area defined by ISO9660 and the UDF Bridge.

The embossed data area of lead-in area 27 records in advance information about the outline of the information recording medium, information about recording, playback, and erase characteristics, and information about the manufacture of the information recording medium. Information about the outline of the information recording medium is information such as the disc type (DVD-RAM, DVD-ROM, CD-ROM, or the like) of optical disc 10, the disc size, the recording density, the physical sector number representing the recording start/recording end position, and the like. Information about recording, playback, and erase specifications is information such as the recording power, the recording pulse width, the erase power, the playback power, the recording/erase linear velocity, and the like. Information about the manufacture of the information recording medium is information such as the manufacturing number.

The rewritable areas of lead-in and lead-out areas 27 and 26 have unique disc name recording areas for identifying the information recording medium, test recording areas (for confirming recording/erase conditions), and defective management information recording areas about defective areas in data area DA. These areas allow recording by the digital information recording/playback system.

Data area DA includes a data recording area for recording predetermined data. Data area DA allows mixed recording of computer data, audio data, and video data. In this data area DA, the recording order and recording information sizes of computer data, audio data, and video data can be arbitrarily set. In FIG. 3, areas which record computer data will be called computer data areas DA1 and DA3, and an area which records audio & video data will be called audio & video data area DA2.

Audio & video data area DA2 records control information DA21, video object DA22, picture object DA23, and audio object DA24. Control information DA21 is control information necessary for processes such as picture recording (sound recording), playback, editing, and search. Video object DA22 is recording information (moving picture data) as contents of video data. Picture object DA23 includes still pictures such as slides and stills, information for searching video data for target data, and information about an edit thumbnail in video data. Audio object DA24 is sound recording information as contents of audio data.

Control information DA21 includes playback control information DA211, recording control information DA212, edit control information DA213, and reduced drawing control information DA214. Playback control information DA211 is control information necessary for playback. Recording control information DA212 is control information necessary for recording (picture recording and sound recording). Edit control information DA213 is control information necessary for editing. Reduced drawing control information DA214 includes information for searching video data for target data, and management information about an edit thumbnail in video data.

Reduced drawing control information DA214 includes anchor pointer DA2141 and picture address table DA2142. Picture address table DA2142 records menu index information INFO1, index picture information INFO2, slide & still picture information INFO3, information picture information INFO4, defective area information INFO5, and wallpaper picture information INFO6.

Figure 4:
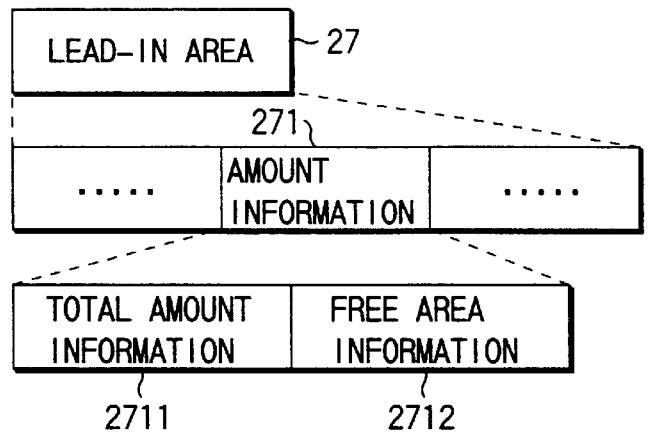
FIG. 4 is a view showing information included in a lead-in area.

Information included in lead-in area 27 will be described with reference to FIG. 4.

The lead-in area 27 includes a data recording area for recording amount information 271. Amount information 271 has a data recording area for recording total amount information 2711 and free area information 2712. Total amount information 2711 records the total amount of optical disc 10. Free area information 2712 records a free area (remaining area) of optical disc 10. Note that total amount information 2711 and free area information 2712 are information to be printed, which will be described in detail below. The hierarchical structure of lead-in area 27 will be explained in more detail with reference to FIG. 9 to FIG. 11.

Figure 5:
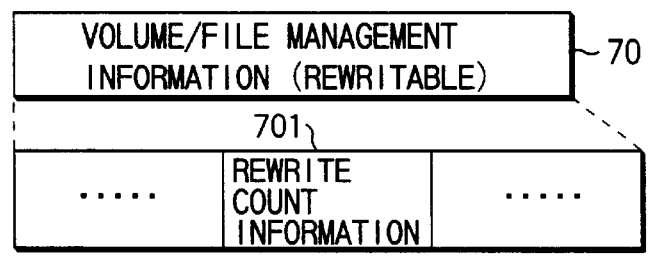
FIG. 5 is a view showing information included in volume/file management information.

Information included in volume/file management information 70 will be described with reference to FIG. 5.

Volume/file management information 70 includes a data recording area for recording rewrite count information 701. Rewrite count information 701 records the data rewrite count with respect to data area DA. Note that rewrite count information 701 is information to be printed, which will be described in detail below.

Figure 6:
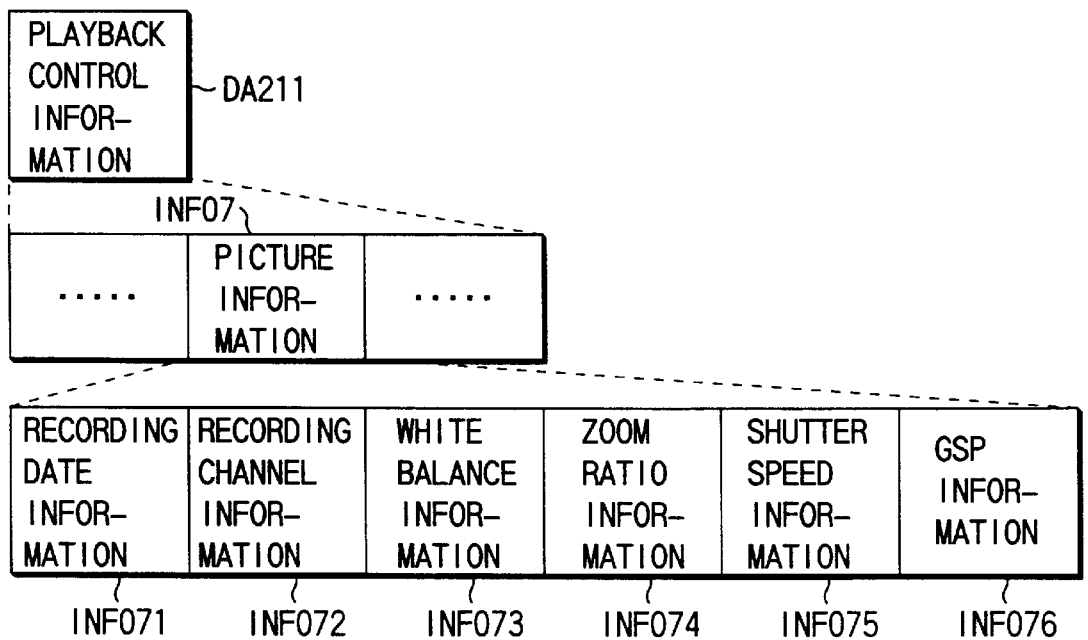
FIG. 6 is a view for explaining information included in playback control information.

Information included in playback control information DA211 will be described with reference to FIG. 6.

Playback control information DA211 includes a data recording area for recording picture information INFO7. Picture information INFO7 is additional data about moving picture data included in video object DA22. This additional data contains, e.g., recording date information INFO71, recording channel information INFO72, white balance information INFO73, zoom ratio information INFO74, shutter speed information INFO75, and GPS information INFO76. Note that these additional data are information to be printed, which will be described in detail below.

Figure 7:
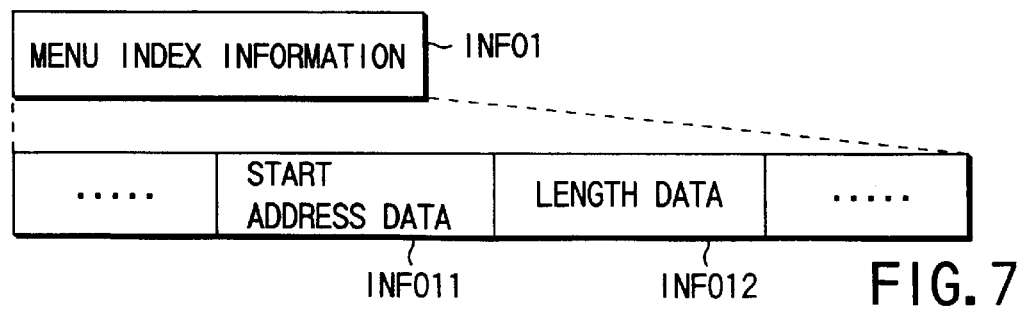
FIG. 7 is a view for explaining information included in menu index information.

Information included in menu index information INFO1 will be described with reference to FIG. 7.

Menu index information INFO1 includes data recording areas for recording start address data INFO11 and length data INFO12. Start address data INFO11 is data representing the start of an address indicating the storage location of representative picture data corresponding to a representative frame (to be described later). Length data INFO12 is data representing a length from the address indicated by the start address data. This means that representative picture data is stored between the address indicated by start address data INFO11 and the address corresponding to the length indicated by length data INFO12. A combination of start address data INFO11 and length data INFO12 indicates the storage location of representative picture data.

Information included in control information DA21 and video object DA22 will be described with reference to FIG. 8.

Figure 8:
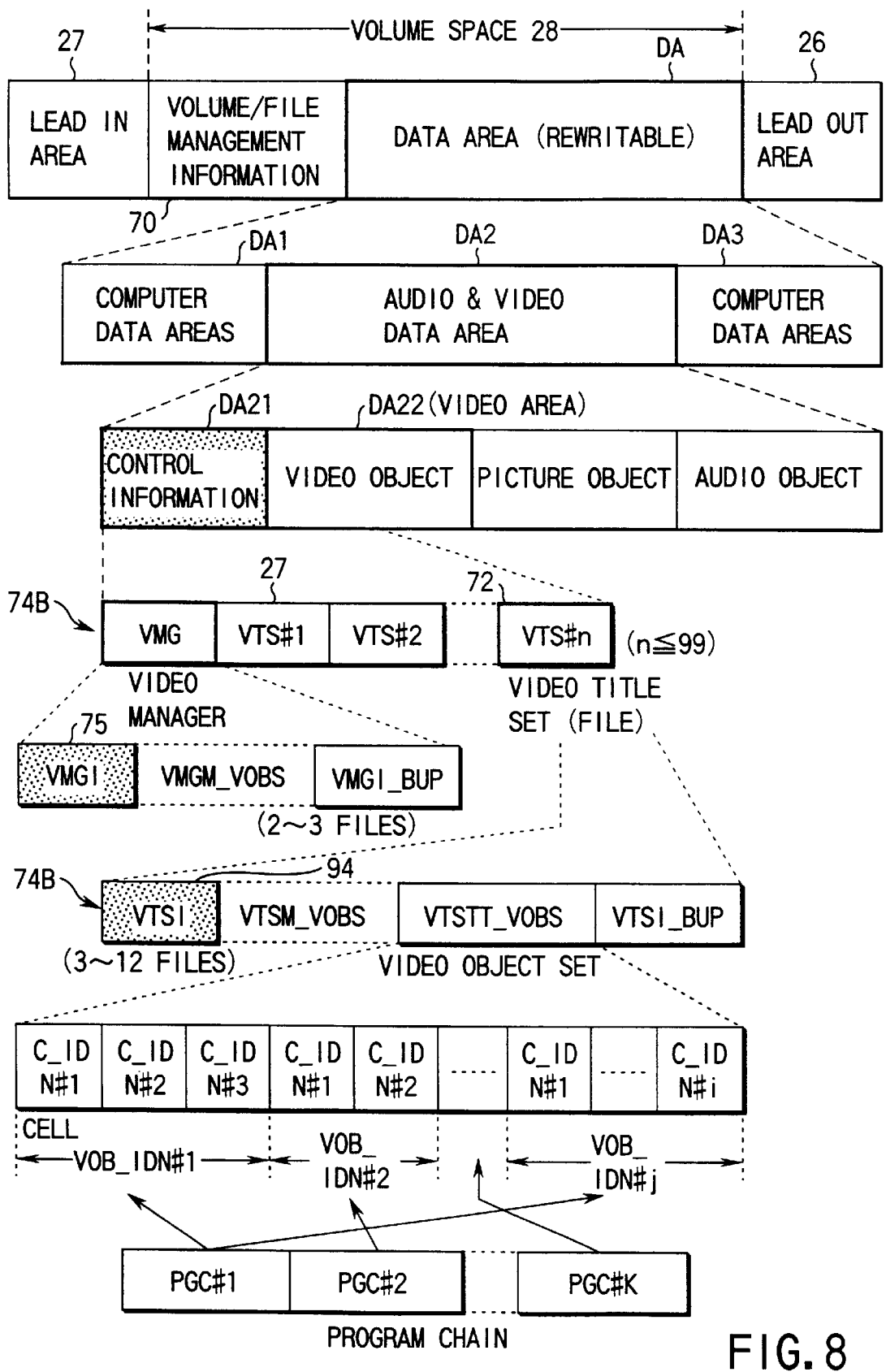
FIG. 8 is a view for explaining information included in control information and a video object.

Referring to FIG. 8, video manager VMG consists of a plurality of files 74A. These files 74A describe information (video manager information VMGI, video object set VMGM_VOBS for video manager menus, and video manager information backup file VMGI_BUP) for managing video title sets (VTS#1 to VTS#n) 72.

Each video title set VTS 72 stores video data (video pack to be described later) compressed by MPEG, audio data compressed by a predetermined format or uncompressed audio data (audio pack), runlength-compressed sub-picture data (sub-picture pack to be described later; including bitmap data, each pixel of which is defined by a plurality of bits), and also information for playing back these data (navigation pack to be described later; including presentation control information PCI and data search information DSI).

Video title set VTS 72 is also made up of a plurality of files 74B as in video manager VMG. Each file 74B contains video title set information VTSI, object set VTSM_VOBS for video title set menus, video object sets VTSTT_VOBS for video title set titles, and backup information VTSI_BUP for video title set information.

Note that the number of video title sets (VTS#1 to VTS#n) 72 is limited to a maximum of 99, and the number of files 74B that make up each video title set VTS 72 is limited to a maximum of 12. These files 74A and 74B are similarly split up at the boundaries of logical sectors.

Other recording area 73 can record information that can be used in video title sets VTS 72 mentioned above or other kinds of information that do not pertain to video title sets. This area 73 is not mandatory, and may be deleted if it not used.

As will be described later with reference to FIG. 11, each video object set VTSTT_VOBS for video title set titles defines a set of one or more video objects VOB. Each VOB defines a set of one or more cells. A set of one or more cells make up program chain PGC.

Assuming that one PGC corresponds to one drama, a plurality of cells that make up this PGC can correspond to various scenes in that drama. The contents of the PGC (or those of cells) are determined by, e.g., a software provider who produces the contents recorded on disc 10.

Figure 9:
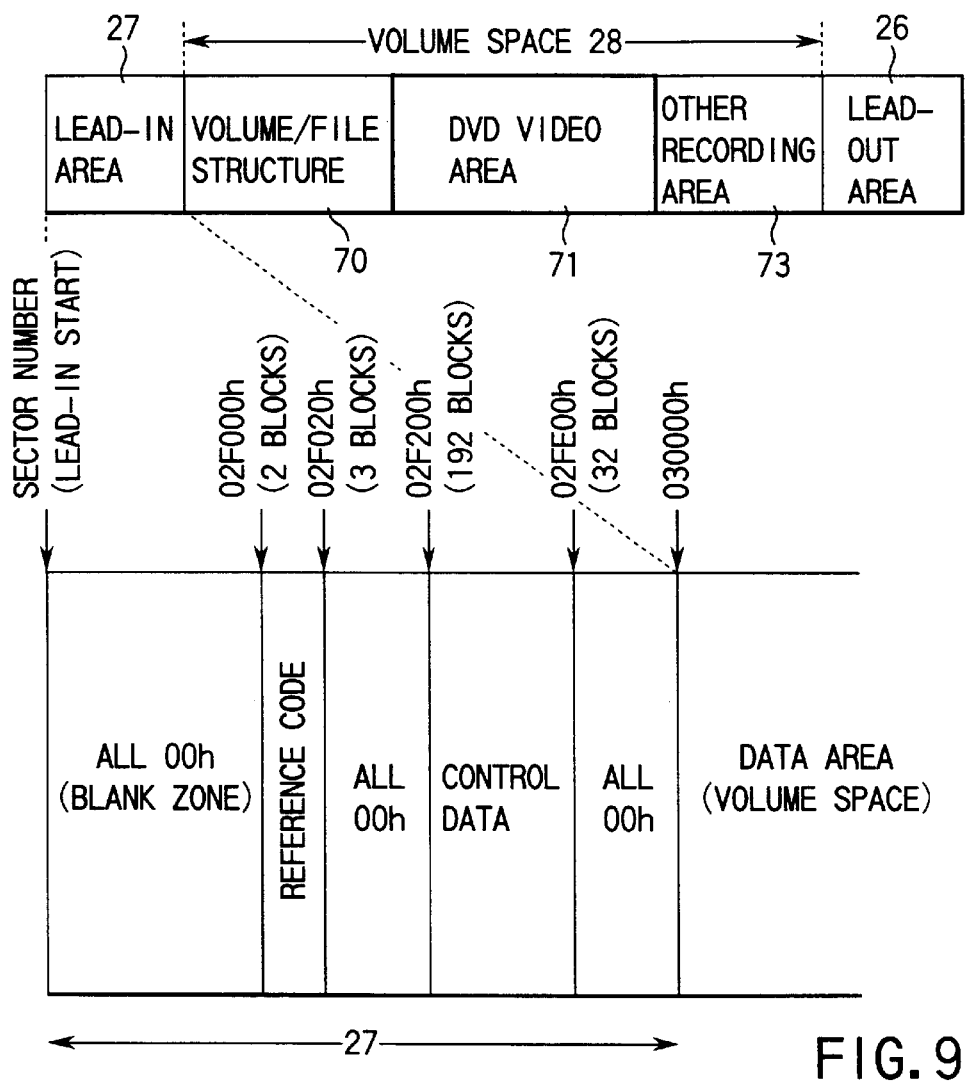
FIG. 9 is a view for explaining the logical structure of information (lead-in area) recorded on the optical disc in FIG. 1.

FIG. 9 is a view for explaining information recorded on lead-in area 27 of optical disc 10. When disc 10 is set in the DVD video recorder to be described later (or DVD video player not shown), information on lead-in area 27 is read first. Lead-in area 27 records a predetermined reference code and control data in ascending order of sector numbers.

The reference code in lead-in area 27 is made up of two error correction code blocks (ECC blocks). Each ECC block consists of 16 sectors. These two ECC blocks (32 sectors) are created by adding scramble data. Upon playing back the reference code added with the scramble data, filter operation or the like on the playback side is done to play back a specific data symbol (e.g., 172), thus assuring data read precision after that.

The control data in lead-in area 27 is made up of 192 ECC blocks. This control data field repetitively records the contents for 16 sectors in each block 192 times. First one sector (2,048 bytes) constituting the control data (16 sectors) in lead-in area 27 contains physical format information, and the subsequent 15 sectors contain disc manufacturing information and contents provider information.

The contents of the physical format information will be described.

The first byte position "0" describes the version of the DVD format that the recorded information complies with.

The second byte position "1" describes the size (12 cm, 8 cm, or the like) of a recording medium (optical disc 10) and minimum read-out rate. In case of a read-only DVD video, 2.52 Mbps, 5.04 Mbps, and 10.08 Mbps are prescribed minimum read-out rates, but other minimum read-out rates are reserved. For example, when a DVD video recorder capable of variable bit rate recording records at an average bit rate of 2 Mbps, the minimum read-out rate can be set to fall within the range from 1.5 to 1.8 Mbps using the reserve field.

The third byte position "2" describes the disc structure (the number of recording layers, track pitch, recording layer type, and the like) of the recording medium (optical disc 10). Based on this recording layer type, disc 10 can be identified to be a DVD-ROM, DVD-R, or DVD-RAM (or DVD-RW).

The fourth byte position "3" describes the recording density (linear density & track density) of the recording medium (optical disc 10). The linear density indicates the recording length per bit (0.267 μm/bit, 0.293 μm/bit, or the like). On the other hand, the track density indicates the neighboring track spacing (0.74 μm/track, 0.80 μm/track, or the like). The fourth byte position "3" also includes a reserve field to designate other numerical values as the linear density and track density of a DVD-RAM or DVD-R.

The fifth byte position "4 to 15" describes the start and end sector numbers of data area 28 and the like of the recording medium (optical disc 10).

The sixth byte position "16" describes a burst cutting area (BCA) descriptor. This BCA is applied as an option to a DVD-ROM disc alone, and is an area for storing recorded information upon completion of the disc manufacturing process.

The seventh byte position "17 to 20" describes a free space or free area of the recording medium (optical disc 10). For example, when disc 10 is a single-sided recording DVD-RAM disc, information indicating 2.6 GB (or the number of sectors corresponding to this number of bytes) is stored at that position of disc 10. On the other hand, when disc 10 is a double-sided recording DVD-RAM disc, information indicting 5.2 GB (or the number of sectors corresponding to this number of bytes) is stored at that position.

The eighth and ninth byte positions "21 to 31" and "32 to 2,047" are reserved for the future.

Figure 10:
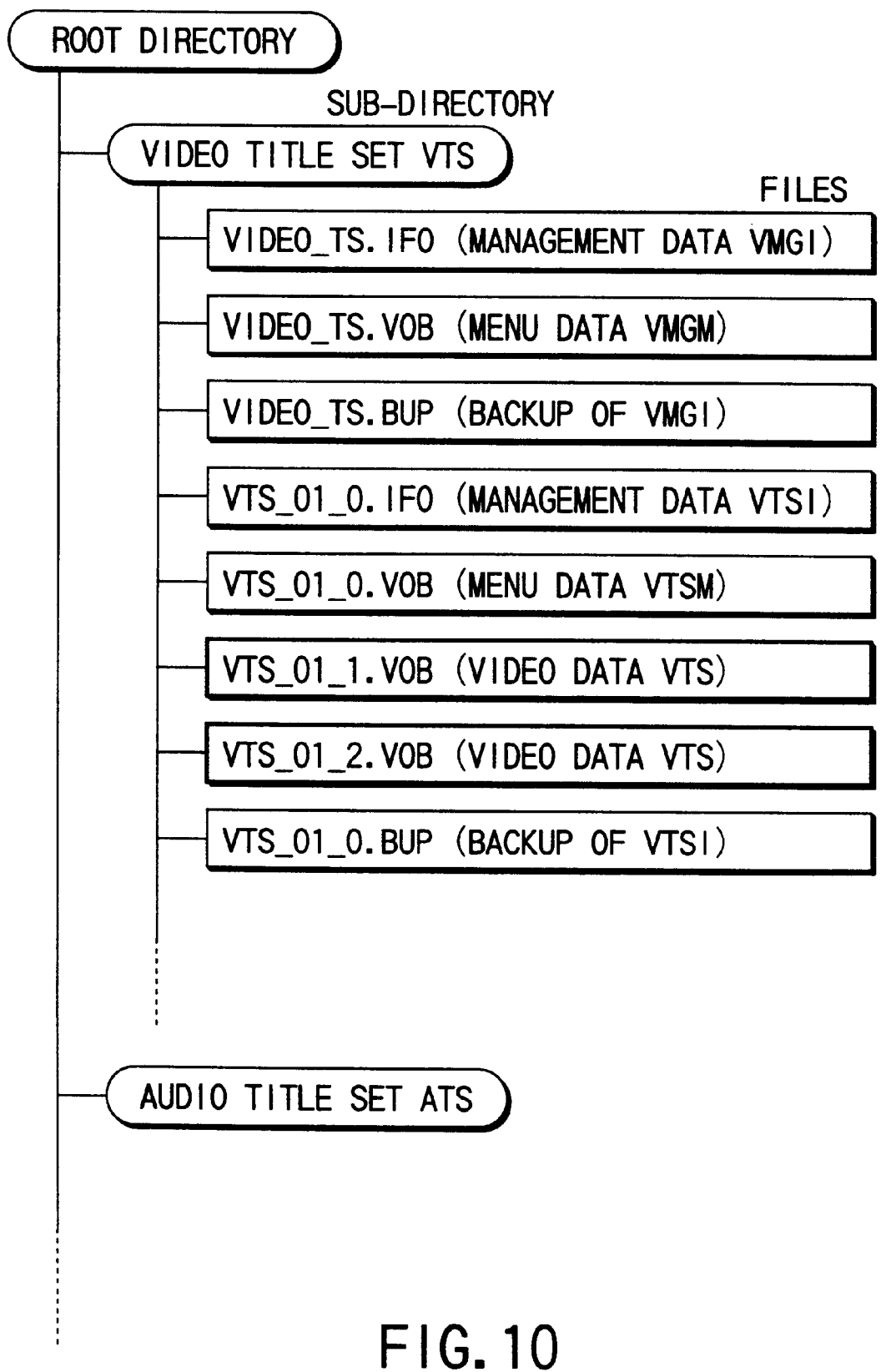
FIG. 10 is a view for explaining the directory structure of information (data file) recorded on the optical disc in FIG. 1.

FIG. 10 exemplifies the directory structure of information (data files) recorded on optical disc 10. As in the hierarchical file structure used by a versatile operation system of a computer, the subdirectory of video title set VTS and that of audio title set ATS are made under the root directory. Various video files (files VMGI, VMGM, VTSI, VTSM, VTS, and the like) are allocated in the subdirectory of video title set VTS to manage the individual files systematically. A specific file (e.g., specific VTS) can be accessed by designating the path from the root directory to that file.

DVD-RAM (DVD-RW) disc 10 or DVD-R disc 10 shown in FIG. 1 may be pre-formatted to have the directory structure shown in FIG. 10, and pre-formatted discs 10 may be put on the market as unused discs (raw discs) for DVD video recording.

That is, the root directory of pre-formatted raw disc 10 includes a subdirectory named a video title set (VTS). This subdirectory can contain various management data files (VIDEO_TS.IFO, VTS_01_0.IFO); backup files (VIDEO TS.BUP, VTS_01_0.BUP) for backing up information of these management data files; and a video data file (VTS_01_1.VOB) which is managed based on the contents of the management data files and stores digital moving picture information.

The subdirectory can also contain menu data files (VMGM, VTSM) for storing predetermined menu information.

The contents of a directory record corresponding to the directory structure shown in FIG. 10 will be described.

The first relative byte position "0" describes the directory record length.

The second relative byte position "1" describes the record length of an assigned extent attribute.

The third relative byte position "2" describes the first logical sector number assigned to an extent.

The fourth relative byte position "10" describes the data length of the file field.

The fifth relative byte position "18" describes the recording data/time of information in the extent described in the directory record. Data at the relative byte position "18" can be used for recording the recording data/time of a recorded program (corresponding to specific VTS) in the DVD video recorder.

The sixth relative byte position "25" describes a file flag indicating the characteristics of files defined in Table 10 of ISO9660.

The seventh relative byte position "25" describes the file unit size assigned to the file field.

The eighth relative byte position "27" describes the interleaved gap size assigned to the file field.

The ninth relative byte position "28" describes the volume sequence number in the volume set on the extent described in the directory record.

The 10th relative byte position "32" describes the file ID field length of the directory record.

The 11th relative byte position "33" describes the file ID or the directory defined by ISO9660.

Next to the file ID, a padding field serving as stuffing when the file ID field has an even-byte length is described.

Next to the padding field, copyright management information used by the system is described.

After the copyright management information, a read flag (or played back flag) indicating whether or not a specific recorded file (e.g., VTS_01_1.VOB in FIG. 10) has been read out once (or that VTS has been played back at least once previously) is described. The read flag for a file which is not yet read out is set at "0". If the file has been read out at least once, the read flag of that file is set at "1".

Next to the read flag, an archive flag (or permanent keep flag) indicating whether or not a specific recorded file (e.g., VTS_01_1.VOB in FIG. 10) has contents to be kept permanently (or contents that are prevented from being erroneously erased or deleted) is described. The archive flag for a file which can be erased is set at "0". The archive flag for a file which is to be kept permanently without being erased is set at "1".

Figure 11:
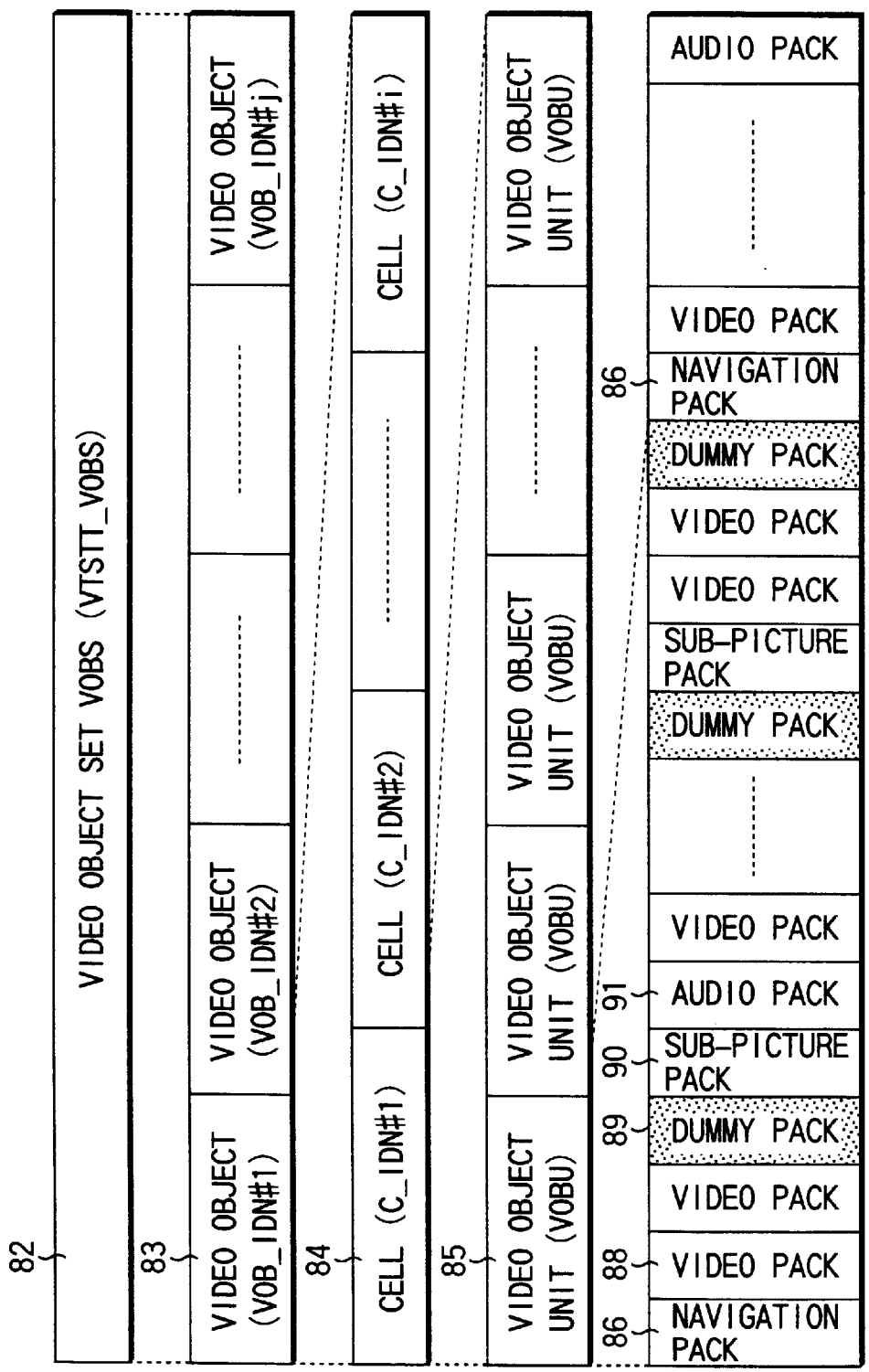
FIG. 11 is a view for explaining the hierarchical structure of information included in video object set VTSTT_VOBS in FIG. 8.

FIG. 11 shows the hierarchical structure of information contained in video object set VTSTT_VOBS shown in FIG. 8.

As shown in FIG. 11, each cell 84 consists of one or more video object units (VOBU) 85. Each video object unit 85 is constituted as a set (pack sequence) of video packs (V packs) 88, sub-picture packs (SP packs) 90, and audio packs (A packs) 91 to have navigation pack (NV pack) 86 at the beginning of the sequence. That is, video object unit VOBU 85 is defined as a set of all packs recorded from certain navigation pack 86 to a pack immediately before the next navigation pack 86.

Each of these packs serves as a minimum unit for data transfer. The minimum unit for logical processing is a cell, and logical processing is done in units of cells.

Navigation pack 86 is built in each video object unit VOBU 85 to realize both angle changes (non-seamless playback and seamless playback).

The playback time of video object unit VOBU 85 corresponds to that of video data made up of one or more picture groups (groups of pictures; to be abbreviated as GOPs) included in video object unit VOBU 85, and is set to fall within the range from 0.4 sec to 1.2 sec. One GOP is screen data which normally has a playback time of about 0.5 sec in the MPEG format, and is compressed to play back approximately 15 images during this interval.

When video object unit VOBU 85 includes video data, a video datastream is formed by arranging GOPs (complying with MPEG) each consisting of video packs 88, sub-picture packs 90, and audio packs 91. However, independently of the number of GOPs, video object unit VOBU 85 is defined with reference to the playback time of GOPs, and navigation pack 86 is always set at the beginning of unit 85, as shown in FIG. 11.

Even playback data consisting of audio data and/or sub-picture data alone is formed using video object unit VOBU 35 as one unit. For example, when video object unit VOBU 85 is formed by audio packs 91 alone to have navigation pack 86 at its beginning, audio packs 91 to be played back in the playback time of video object unit VOBU 85 to which the audio data belong are stored in that video object unit VOBU 85 as in video object VOB 83 of video data.

When a DVD video recorder can record video title set VTS containing VOBSs 82 with the structure shown in FIG. 11 on optical disc 10, the user often wants to edit the recording contents after the VTS is recorded. In order to meet such requirement, dummy packs 89 can be appropriately inserted in each VOBU 85. Each dummy pack 89 can be used for recording edit data later.

As shown in FIG. 11, video object set (VTSTT_VOBS) 82 is defined as a set of one or more video objects (VOB) 83. Video objects VOB 83 in video object set VOBS 82 are used for the same purpose.

VOBS 82 for menus normally consists of one VOB 83, which stores a plurality of menu screen display data. By contrast, VOBS 82 for a title set normally consists of a plurality of VOBs 83.

Taking a concert video title of a certain rock band as an example, VOBs 83 that form video object set VTSTT_VOBS 82 for a title set correspond to picture data of the performance of that band. In this case, by designating given VOB 83, for example, the third tune in the concert of the band can be played back.

VOB 83 that forms video object set VTSM_VOBS for menus stores menu data of all the tunes performed in the concert of the band, and a specific tune, e.g., an encore, can be played back according to the menu display.

Note that one VOB 83 can form one VOBS 82 in a normal video program. In this case, a single video stream comes to an end in one VOB 83.

On the other hand, in case of a collection of animations having a plurality of stories or an omnibus movie, a plurality of video streams (a plurality of video chains PGC) can be set in single VOB 82 in correspondence with the respective stories. In this case, the individual video streams are stored in corresponding VOBs 83. An audio stream and sub-picture stream pertaining to each video stream end in corresponding VOB 83.

VOBs 83 are assigned identification numbers (IDN#i; i=0 to i), and that VOB 83 can be specified by the identification number. VOB 83 consists of one or more cells 84. A normal video stream consists of a plurality of cells, but a video stream for menus often consists of single cell 84. Cells 84 are assigned identification numbers (C_IDN#j) as in VOBs 83.

Figure 12:
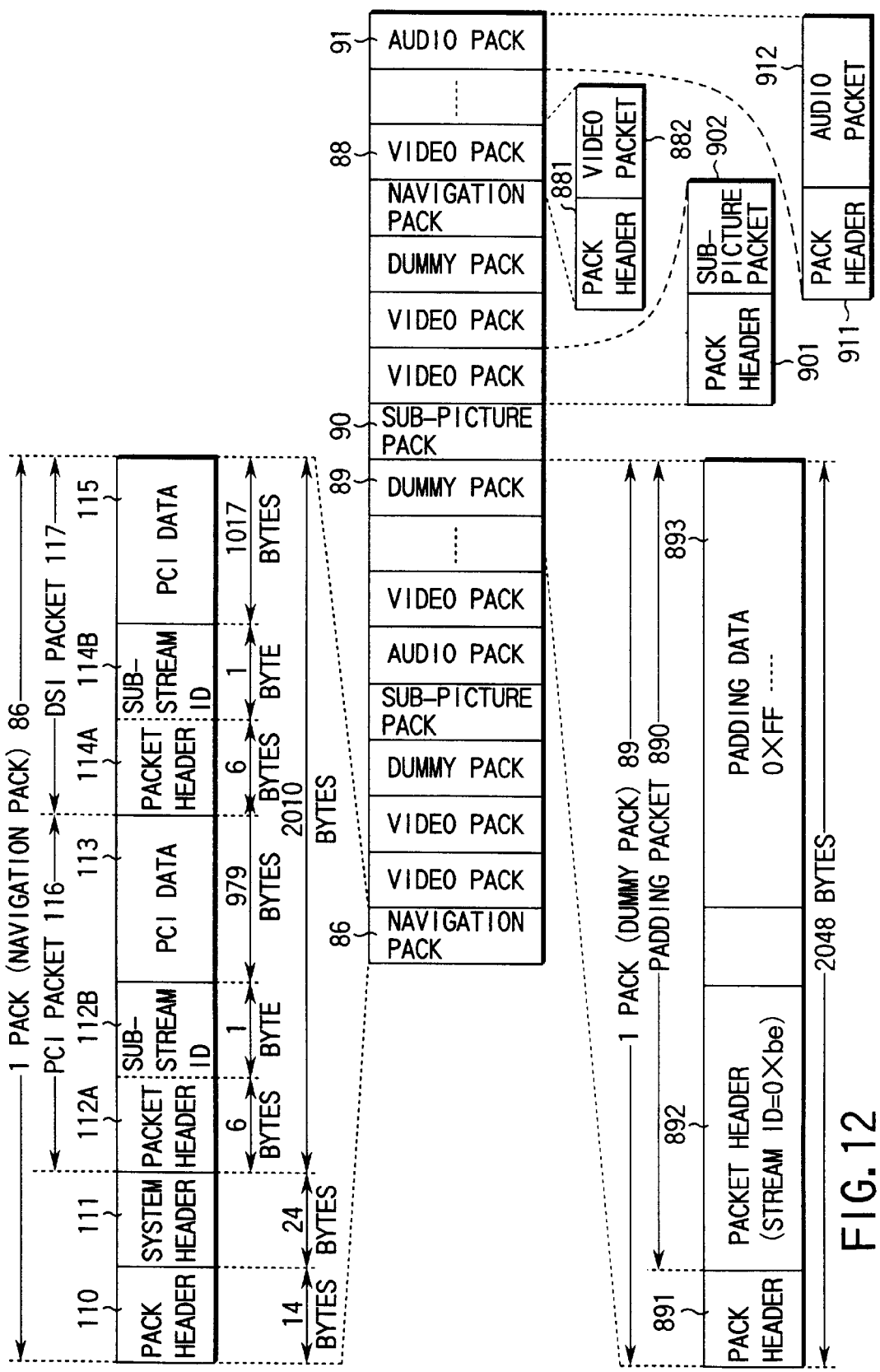
FIG. 12 is a view for explaining the contents of packs in the lowermost layer of the hierarchical structure in FIG. 11.

FIG. 12 exemplifies a data sequence (pack sequence) in the pack format, which is obtained after data recorded on optical disc 10 are read out, and are subjected to signal demodulation/error correction in a disc drive (not shown). This pack sequence includes navigation pack (control pack) 86, video packs 88, dummy packs 89, sub-picture packs 90, and audio packs 91. All these packs consist of data in units of 2 kybtes as in the logical sectors shown in FIG. 2B.

Navigation pack 86 includes pack header 110, playback control information/presentation control information (PCI) packet 116, and data search information (DSI) packet 117. PCI packet 116 is made up of packet header 112 and PCI data 113, and DSI packet 117 of packet header 114 and DSI data 115. PCI packet 116 contains control data used upon switching the non-seamless angles, and DSI packet 117 contains control data used upon switching the seamless angles.

Note that the angle switching means changes in angle (camera angle) of watching the object picture. In case of a rock concert video title, for example, the user can watch scenes from various angles, e.g., a scene that mainly captures a vocalist, a scene that mainly captures a guitarist, a scene that mainly captures a drummer, and the like in a performance scene of an identical tune (identical event).

The angle is switched (changed) when the viewer can select angles in accordance with his or her favor, and when an identical scene automatically repeats itself with-different angles in the flow of story (if the software producer/provider has programmed the story in such way; or if the user of the DVD video recorder edits in such way).

The angles are set in the following cases: temporally discontinuous, non-seamless playback that presents and identical scene of different angles (for example, in a scene at the instance when a certain boxer throws a counterpunch, the camera angle is changed to another angle to play back a scene in which the counterpunch begins to be thrown), and temporally continuous, seamless playback that changes the angle between temporally continuous scenes (for example, at the instance when a certain boxer has made a counterpunch, the camera angle is changed to another angle to play back a scene in which the other boxer who got the punch is blown off).

Video pack 88 is comprised of pack header 881 and video packet 882. Dummy pack 89 is comprised of pack header 891 and padding packet 890, and padding packet 890 of packet header 892 and padding data 893. Note that padding data 893 stores insignificant data.

Sub-picture pack 90 is made up of pack header 901 and sub-picture packet 902. Audio pack 91 is made up of pack header 911 and audio packet 912.

Note that video packet 882 in FIG. 12 contains a packet header (not shown), which records a decode time stamp (DST) and presentation time stamp (PTS). Each of sub-picture packet 902 and audio packet 912 contains a packet header (not shown), which records a presentation time stamp (PTS).

Subsequently, the data structure for one navigation pack will be described.

More specifically, one navigation pack 86 consists of 2,010 byte navigation data including 14 byte pack header 110, 24 byte system header 111, and two packets (116, 117). The two packets that form the navigation data are presentation control information (PCI) packet 116 and data search information (DSI) packet 117 in the description of FIG. 12.

PCI packet 116 consists of 6 byte packet header 112A, 1 byte substream identifier (substream ID) 112B, and 979 byte PCI data 113. The datastream of PCI data 113 is designated by an 8 bit code "00000000" of substream ID 112B.

DSI packet 117 is constructed by 6 byte packet header 114A, 1 byte substream identifier (substream ID) 114B, and 1,017 byte DSI data 115. The datastream of DSI data 115 is designated by an 8 bit code "00000001" of substream ID 114B.

The data length for one navigation pack 86 with the above structure is 2,048 bytes (2 kbytes) corresponding to one logical sector shown in FIG. 2B.

Pack header 110 and system header 111 are defined by the MPEG2 system layer. More specifically, pack header 110 stores information such as a pack start code, system clock reference (SCR), and multiplexing rate, and system header 111 describes a bit rate and stream ID. Likewise, packet header 112A of PCI packet 116 and packet header 114A of DSI packet 117 each store a packet start code, packet length, and stream ID, as defined by the MPEG2 system layer.

The structure for one dummy pack will be described. That is, one dummy pack 89 is made up of pack header 891, packet header 892 with a predetermined stream ID, and padding data 893 padded with a predetermined code. (Packet data 892 and padding data 893 form padding packet 890). The contents of padding data 893 in a non-used dummy pack are not especially significant. This dummy pack 89 can be appropriately used when the recording contents are to be edited after predetermined recording is done on disc 10.

For example, a case will be examined below wherein the contents of a video tape that recorded a family trip using a portable video camera are recorded and edited on DVD-RAM (or DVD-RW) disc 10.

In this case, only the video scenes to be stored in a single disc are selectively recorded on disc 10. These video scenes are recorded in video pack 88 shown in FIG. 11. Also, audio data simultaneously recorded by the video camera is recorded in audio pack 91.

Each VOBU 85 that includes video pack 88 and the like has navigation pack 86 at its beginning. As shown in FIG. 12, this navigation pack 86 contains presentation control information PCI and data search information DSI. Using this PCI or DSI, the playback procedure of each VOBU can be controlled (for example, discontinuous scenes can be automatically connected or a multiangle scene can be recorded).

After the contents of the video tape are edited and recorded on disc 10, when a voice, effect sound, and the like are to be postrecorded (or after-recorded) in each scene in units of VOBU or a background music (BGM) is added, such postrecording (or after-recording) audio data or BGM can be recorded in dummy pack 89. When a comment for the recorded contents is to be added, sub-pictures such as additional characters, figures, and the like can be recorded in dummy pack 89. Furthermore, when an additional video picture is to be inserted, the inserted video picture can be recorded in dummy pack 89.

The above-mentioned postrecording (or after-recording) audio data or the like is written in padding data 893 of dummy pack 89 used as an audio pack. The additional comment is written in padding data 893 of dummy pack 89 used as a sub-picture pack. Similarly, the inserted video picture is written in padding data 893 of dummy pack 89 used as a video pack. Incidentally, when the postrecording (after-recording) is predetermined, silent audio data coded in the same manner as the original audio data can be written in the dummy pack. In this case, the original audio data may be recorded as a first stream, and the silent audio data may be recorded as a second stream.

More specifically, dummy pack 89 is a wildcard pack that can become any of an audio, sub-picture, and video packs depending on its purpose.

Figure 13:
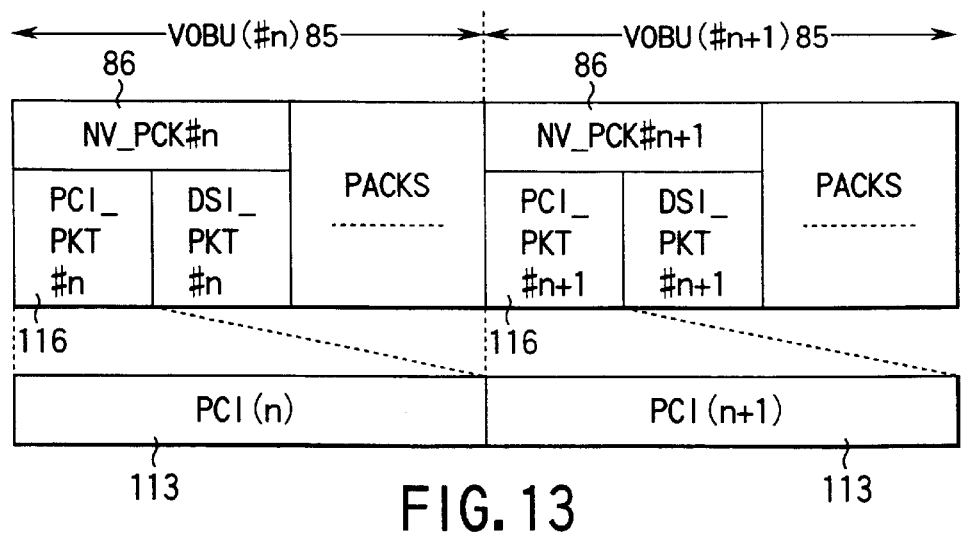
FIG. 13 is a view for explaining the contents of a PCI packet in FIG. 12.

FIG. 13 shows PCI packet 116 included in navigation pack 86 located at the beginning of each VOBU 85. As shown in FIG. 13, PCI packet 116 includes presentation control information PCI (PCI data) 113 as navigation data used for changing the display or playback contents (presentation contents) in synchronism with the playback state of video data in video object unit (VOBU) 85.

The contents of presentation control information (PCI data) 113 will be described. PCI data 113 includes 60 byte PCI general information (PCI_GI), 36 byte non-seamless playback angle information (NSML$_{13}$ AGLI), 694 byte highlight information (HLI), and 189 byte recording information (RECI). This recording information (RECI) can contain a copyright management code (ISRC) of the international standard.

Highlight information HLI is used upon execution of the following highlight processing. More specifically, the MPU (or CPU) of the DVD video recorder (to be described later) reads highlight information HLI, and detects the X-/Y-coordinate values, colors, contrast values, and the like of rectangular regions (highlight buttons) displayed by sub-picture data. The MPU of the DVD video recorder highlights the displayed menu selection item and the like in accordance with these detected data. This highlight processing is used as a means for allowing the user to easily recognize a specific displayed item on the visual user interface. More specifically, when a D video title recorded on optical disc 10 is a multilingual compatible program, a specific spoken language (e.g., English) and a specific superimposed dialogue language (e.g., Japanese) are selected by highlight buttons which are displayed to be visually outstanding by the highlight processing.

The contents of general information PCI_GI of this PCI will be described.

Presentation control information general information PCI_GI describes the logical block number (NV_PCK_LBN) of a navigation pack, the category (VOBU_CAT) of a video object unit (VOBU), user operation control (VOBU_UOP_CTL) of the video object unit (VOBU), the start presentation time (VOBU_S_PTM) of the video object unit (VOBU), the end presentation time (VOBU_E_PTM) of the video object unit (VOBU), the end presentation time (VOBU_SE_PTM) of the sequence end in the video object unit (VOBU), and a cell elapse time (C_ELTM).

Note that the logical block number (NV_PCK_LBN) represents the address (recording location) of a navigation pack including the presentation control information (PCI) by the relative number of blocks from the first logical block in the video object set (VOBS) which includes that PCI.

The category (VOBU_CAT) describes the contents of copy protection of an analog signal corresponding to video and sub-picture data in the video object unit (VOBU) that includes the presentation control information (PCI).

The user operation control (VOBU_UOP_CTL) describes user operations which are prohibited during the display (presentation) period of the video object unit (VOBU) that includes the presentation control information (PCI).

The start presentation time (VOBU_S_PTM) describes the start time of display (presentation) of the video object unit (VOBU) that includes the presentation control information (PCI). More specifically, this VOBU_S_PTM indicates the start display time of the first video (first picture) in the display order of the first GOP in the video object unit (VOBU).

The end presentation time (VOBU_E_PTM) describes the end time of display (presentation) of the video object unit (VOBU) that includes the presentation control information (PCI). More specifically, when the video object unit (VOBU) includes continuous video data, this VOBU_E_PTM indicates the end display time of the last video (last picture) in the display order of the last GOP in the video object unit (VOBU).

On the other hand, when no video data is present in the video object unit (VOBU), or when playback of that video object unit (VOBU) is stopped, this VOBU_E_PTM indicates the end time of virtual video data aligned to the time grids at a field interval (1/60 sec in case of NTSC video).

The end presentation time (VOBU_SE_PTM) describes the end time of display (presentation) based on a sequence end code in video data in the video object unit (VOBU) that includes the presentation control information (PCI). More specifically, this end time indicates the end display time of the last video (last picture) in the display order, which picture includes the sequence end code, in the video object unit (VOBU). If no video (picture) with a sequence end code is present in the video object unit (VOBU), 00000000h (h is an abbreviation for hexadecimal) is set in VOBU_SE_PTM.

The cell elapse time (C_ELTM) describes the relative display (presentation) time from the first video frame in the display order of a cell that includes the presentation control information (PCI) to the first video frame in the display order of the video object unit (VOBU) that includes the PCI in hours, minutes, and seconds in the BCD format and frames. When no video data is present in the video object unit (VOBU), the first video frame of the virtual video data is used as the video frame.

Figure 14:
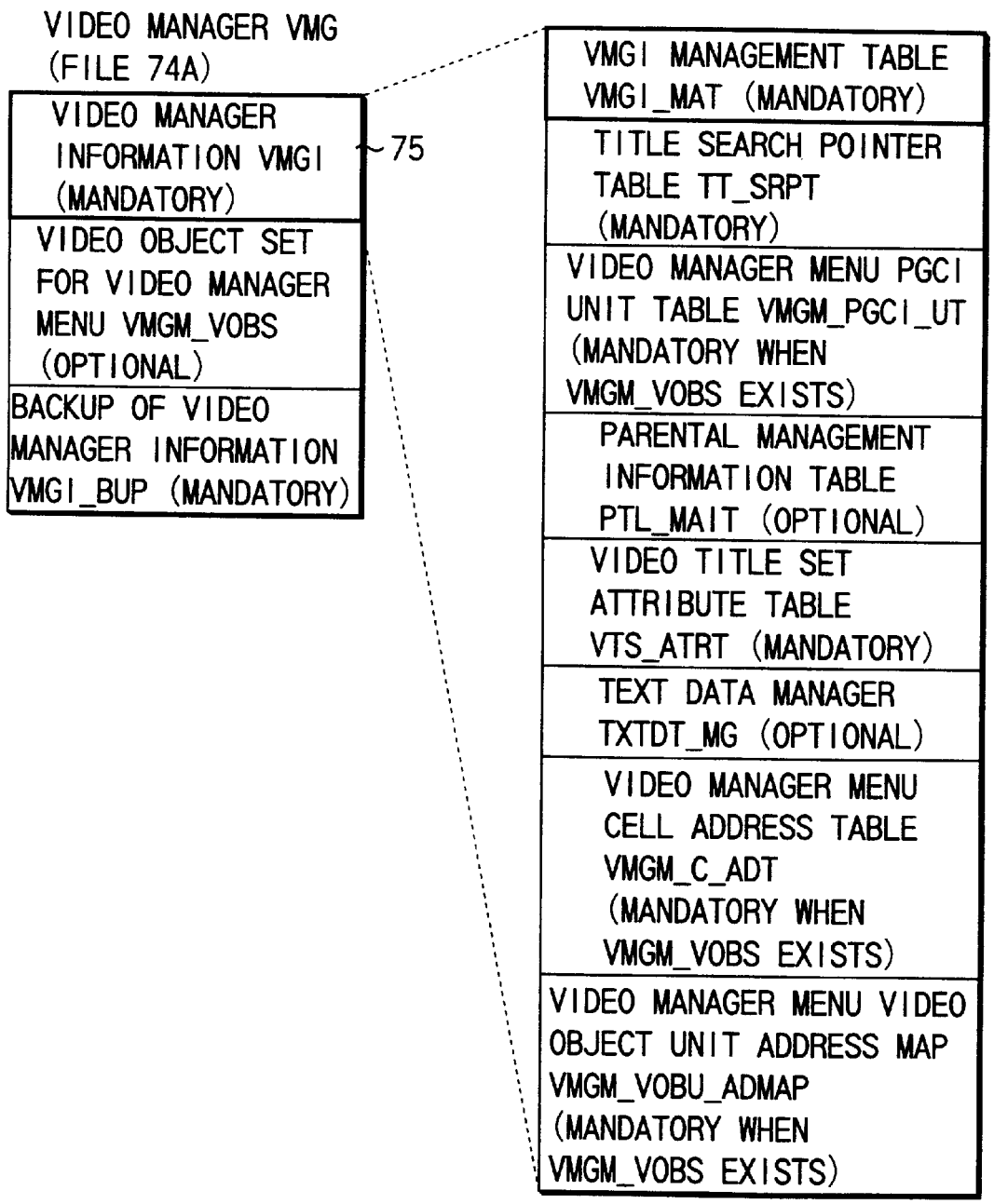
FIG. 14 is a view for explaining the contents of video manager information VMGI in FIG. 8.

FIG. 14 shows the contents of video manager VMG shown in FIG. 8. This VMG consists of a plurality of files 74A. Video manager VMG includes video manager information (VMGI) 75, object set (VMGM_VOBS) for video manager menus, and backup (VMGI_BUP) of video manager information in correspondence with each file.

Note that video manager information VMGI and backup VMGI_BUP of video manager information are mandatory items, and video object set VMGM_VOBS for displaying video manager information menu VMGM is optional.

As shown in FIG. 14, video manager information (VMGI) 75 set at the beginning of video manager VMG describes a video manager information management table (VMGI_MAT; mandatory), title search pointer table (TT_SRPT; mandatory), video manager menu program chain information unit table (VMGM_PGCI_UT; mandatory when VMGM_VOBS exists), parental management information table (PTL_MAIT; option), video title set attribute table (VTS_ATRT; mandatory), text data manager (TXTDT_MG; option), video manager menu cell address table (VMGM_C_ADT; mandatory when VMGM_VOBS exists), and video manager menu video object unit address map (VMGM_VOBU_ADMAP; mandatory when VMGM_VOBS exists) in this order.

Note that the addresses such as an end address (VMGI_MAT_EA) of video manager information management table VMGI_MAT, a start address (TT_SRPT_SA) of title search pointer TT_SRPT, and the like are described as the relative number of logical blocks from the head logical block that stores this table VMGI_MAT.

Video manager information (VMGI) 75 contains information used upon playing back each video title set (VTS) 72 shown in FIG. 8, and such information is recorded on optical disc 10 to match the logical sector boundary.

Video manager information menu video object set VMGM_VOBS stores menu information (managed by video manager VMG) which pertains to video data, audio data, and sub-picture data recorded on optical disc 10.

With this video manager information menu video object set (VMGM_VOBS), the volume name of the optical disc to be played back, and audio and sub-picture comments upon displaying the volume name can be displayed. Also, selectable items can be displayed as sub-picture data.

For example, video manager information menu video object set (VMGM_VOBS) allows to display a comment indicating that the optical disc to be played back contains a video (in a single story or multi-story format) of the road to the world champion of given boxer X as sub-picture data. That is, the fighting pose of boxer X is played back as video data together with the volume name such as "glorious history of boxer X" or the like, high theme (if any) is output as audio data, and the chronological table of his career/records and the like are displayed as sub-picture data.

Also, as the selection items displayed as sub-picture data by VMGM video object set (VMGM_VOBS), (1) an inquiry as to whether a narration voice of the match is played back in English, Japanese, French, German, and the like, (2) an inquiry as to whether or not a superimposed dialog in a predetermined language is displayed as sub-picture data, and (3) an inquiry as to which one of a plurality of selectable language superimposed dialogs is selected, are output. The viewer (the user of the DVD video recorder; to be described later) can select English as the narration voice and Japanese as the sub-picture superimposed dialog from the displayed items by the VMGM video object set (VMGM_VOBS). In this way, the user is ready to watch the video of the match of boxer X.

The above-mentioned features such as comments of the recording contents using sub-picture data and/or audio data, arbitrary selection of a spoken language and superimposed dialog language, and the aforementioned playback angle changes are not available in a conventional video recorder (VHS VCR or the like), but the DVD video recorder of the present invention can have such features.

FIG. 15 shows the contents of video manager information management table VMGI_MAT shown in FIG. 14.

More specifically, video manager information management table VMGI_MAT describes a video manager identifier (VMG_ID); the end address (VMG_EA) of the video manager; the end address (VMGI_EA) of video manager information; a version number (VERN) of the format that optical disc (DVD disc) 10 of interest uses; a video manager category (VMG_CAT); a volume set identifier (VLMS_ID); free space (recordable amount) FREE_SPACE of optical disc 10 on which video title sets VTS shown in FIG. 8 are recorded; the number of videotitle sets (VTS_Ns); a provider (a software producer/distributor) unique identifier (PVR_ID); the end address (VMGI_MAT_EA) of the video manager information management table; the start address (FP_PGCI_SA) of first play program chain information; the start address (VMGM_VOBS_SA) of the video manager menu video object set; the start address (TT_SRPT_SA) of the title search pointer table; the start address (VMGM_PGCI_UT_SA) of the video manager menu program chain information unit table; the start address (PTL_MAIT_SA) of the parental management information table; the start address (VTS_ATRT_SA) of the video title set attribute table; the start address (TXTDT_MG_SA) of the text data manager; the start address (VMGM_C_ADT_SA) of the video manager menu cell address table; the start address (VMGM_VOBU_ADMAP_SA) of the video manager menu video object unit address map; a video attribute (VMGM_V_ATR) indicated by the video manager menu; the number of audio streams (VMGM_AST_Ns) indicated by the video manager menu; an audio stream attribute (VMGM_AST_ATR) indicated by the video manager menu; the number of sub-picture streams (VMGM_SPST_Ns) indicated by the video manager menu; a sub-picture stream attribute (VMGM_SPST_ATR) indicated by the video manager menu; and first play program chain information (FP_PGCI).

Note that video manager category VMG_CAT of video manager information management table VMGI_MAT describes video copy flags and audio copy flags of the video manager and video title sets. Depending on the contents of these flags, whether or not video and audio data can be copied are independently determined.

Free space (recordable amount) FREE_SPACE shown in FIG. 15 equals free space data in the physical format information. The free space of disc 10 may be stored in either a file descriptor (physical format information) or management information (VMGI_MAT). The disc free space after disc 10 is partially recorded can be written in FREE_SPACE in FIG. 15 and/or the free space field of the physical format information (in this case, that data is written in both FREE_SPACE and physical format information).

For example, in case of single-sided DVD-RAM disc 10 having a storage amount of 2.6 GB, information indicating 2.6 GB is written in the free space of the physical information. If no data is recorded on this disc 10 at all, information indicating a value obtained by subtracting management data (including video manager VMG) and the like from 2.6 GB is written in FREE_SPACE in FIG. 15.

If recording for 1 GB has been done on this disc 10, information stored in the free space field of the physical format information is equivalent to 2.6 GB, but information in FREE_SPACE in FIG. 15 is rewritten to that indicating 1.6 GB or equivalent. When such partially recorded disc 10 is set in the DVD video recorder (to be described later), the DVD video recorder initially reads the information in the free space field of the physical format information to detect that set disc 10 is a 2.6 GB disc, and then reds the information in FREE_SPACE in FIG. 15 to detect that the free space of set disc 10 is 1.6 GB. If all the data on this disc 10 are erased, the contents of FREE_SPACE in FIG. 15 and information in the free space field of the physical format information in FIG. 15 are rewritten to indicate 2.6 GB or equivalent.

That is, upon expressing "free space", the free space field of the physical format information and FREE_SPACE in FIG. 15 can have different contents.

Figure 16:
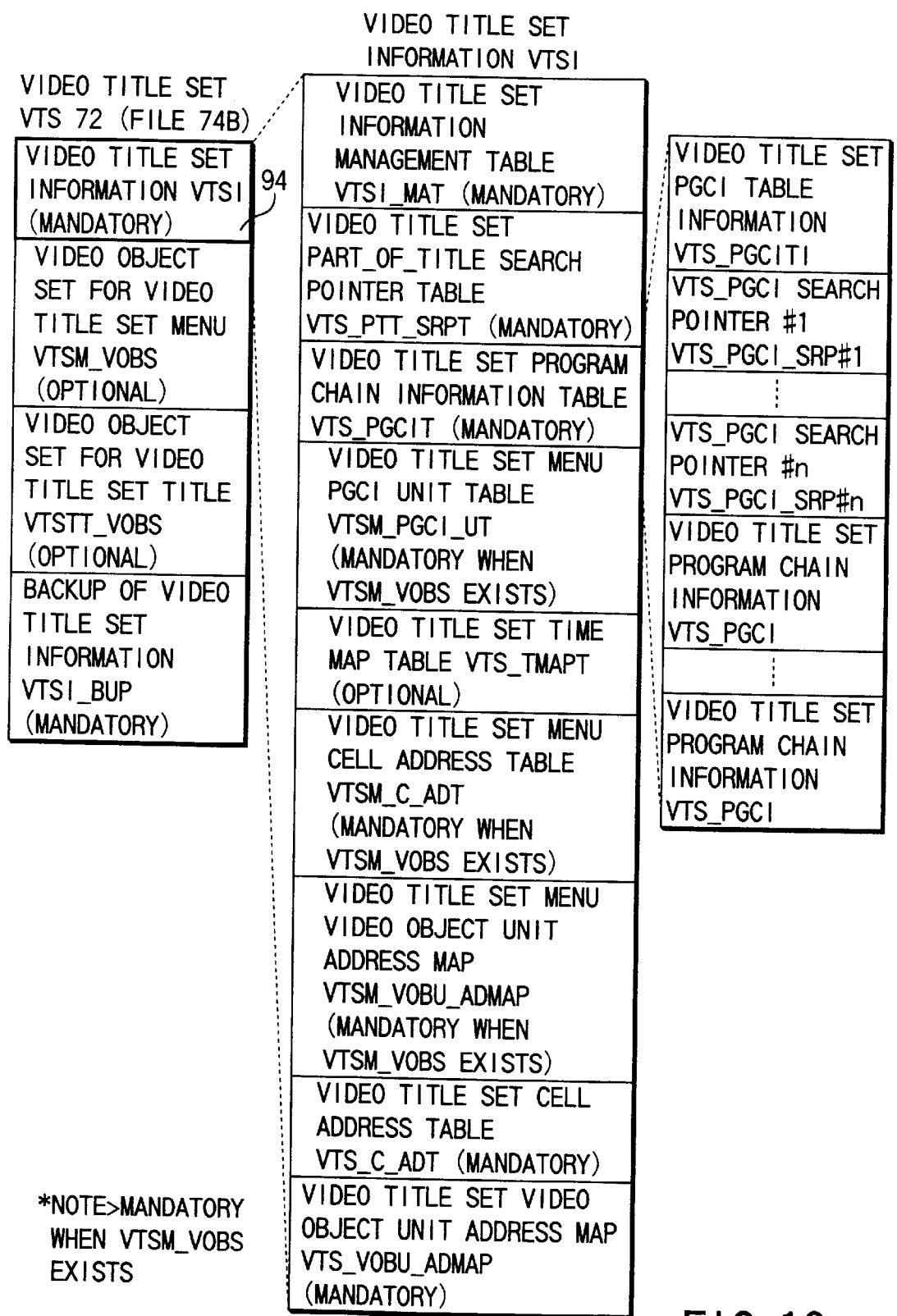
FIG. 16 is a view for explaining the contents of video title set information VTSI in FIG. 8.

FIG. 16 shows the contents of video title set VTS 72 in FIG. 8. Video title set VTS consists of a plurality of files 74B as in video manager VMG shown in FIG. 14. Each file 74B contains video title set information (VTSI) 94, object set (VTSM_VOBS) for video title set menus, video object sets (VTSTT_VOBS; nine files in maximum) for video title set titles, and backup information (VTSI_BUP) for video title set information.

As shown in FIG. 16, video title set information VTSI 94 set at the beginning of video title set VTS 72 describes a video title set information management table (VTSI_MAT; mandatory), a title search pointer table (VTS_PTT_SRPT; mandatory) for a video title set part_of_title (e.g., chapter of a program), a video title set program chain information table (VTS_PGCIT; mandatory), a video title set menu program chain information unit table (VTSM_PGCI_UT; mandatory when VTSM_VOBS exists), a video title set time map table (VTS_TMAPT; option), a video title set menu cell address table (VTSM_C_ADT; mandatory when VTSM_VOBS exists), a video title set menu video object unit address map (VTSM_VOBU_ADMAP; mandatory when VTSM_VOBS exists), a video title set cell address table (VTS_C_ADT; mandatory), and a video title set video object unit address map (VTS_VOBU_ADMAP; mandatory) in this order.

FIG. 17 shows the contents of video title set information management table VTSI_MAT shown in FIG. 16.

As shown in FIG. 17, this video title set information management table VTSI_MAT describes a video title set identifier (VTS_ID), the end address (VT_EA) of the video title set, a played back flag (PLAY_END Flag) indicating whether or not a program (e.g., VTS#1 in FIG. 8) recorded on optical disc 10 has been completely played back at least once, an archive flag (ARCHIVE Flag) which serves to prevent erase errors when a program (e.g., VTS#2 in FIG. 8) recorded on optical disc 10 is to be kept without being erased, the end address (VTSI_EA) of video title set information, a version number (VERN) of the format that this optical disc (DVD disc) 10 uses, a video title set category (VTS_CAT), the end address (VTSI_MAT_EA) of the video title set information management table, the start address (VTSM_VOBS_SA) of the video title set menu video object set, the start address (VTSTT_VOBS_SA) of the video title set title video object set, the start address of (VTS_PTT_SRPT_SA) of the video title set part_of_title search pointer table, the start address (VTS_PGCIT_SA) of the video title set program chain information table, the start address (VTSM_PGCI_UT_SA) of the video title set menu program chain information unit table, the start address (VTS_TMAPT_SA) of the video title set time map table, the start address (VTSM_C_ADT_SA) of the video title set menu cell address table, the start address (VTSM_VOBU_ADMAP_SA) of the video title set menu video object unit address map, the start address (VTS_C_ADT_SA) of the video title set cell address table, the start address (VTS_VOBU_ADMAP_SA) of the video title set video object unit address map, information of attributes of video data, audio data, sub-picture data, and the like, the number of sub-picture streams (VTS_SPST_Ns) of the video title set, a sub-picture stream attribute table (VTS_SPST_ATRT) of the video title set, and a multichannel audio stream attribute table (VTS_MU_AST_ATRT) of the video title set.

Note that the respective information items of table VTSM_MAT are aligned to the logical block boundaries of data recorded on optical disc 10.

The contents of video title set program chain information table VTS_PGCIT shown in FIG. 16 will be described.

As shown in FIG. 16, this video title set program chain information table VTS_PGCIT contains video title set program chain information table information (VTS_PGCITI), video title set program chain information search pointers (VTS_PGCI_SRP#1 to VTS_PGCI_SRP#n), and video title set program chain information (VTS_PGCI).

Note that the order of a plurality of pieces of video title set program chain information VTS_PGCI is set independently of that of the plurality of video title set program chain information search pointers VTS_PGCI_SRP#1 to VTS_PGCI_SRP#n. Hence, for example, single program chain information VTS_PGCI can be indicated by one or more program chain information search pointers VTS_PGCI_SRP.

The contents of video title set program chain information VTS_PGCI shown in FIG. 16 will be described. That is, program chain information (PGCI) is made up of program chain general information (PGC_GI; mandatory), a program chain command table (PGC_GI; mandatory), program chain general information (PGC_CMDT; option), a program chain program map (PGC_CMAP; mandatory when C_PBIT to be described below exists), a cell playback information table (C_PBIT; option), and a cell position information table (C_POSIT; mandatory when C_PBIT above exists).

The contents of cell playback information table C_PBIT will be described. Cell playback information table C_PBIT contains a maximum of 255 pieces of cell playback information (C_PBI#1 to C_PBI#n).

The contents of cell playback information C_PBI (C_PBI#1 to C_PBI#n) will be described. Each cell playback information (C_PBI) includes a cell category (C_CAT; 4 bytes), cell playback time (C_PBTM; 4 bytes), the start address (C_FVOBU_SA; 4 bytes) of the first video object unit (VOBU) in the cell, the end address (C_FILVU_EA; 4 bytes) of the first interleaved unit (ILVU) in the cell, the start address (C_LVOBU_SA; 4 bytes) of the last video object unit (VOBU) in the cell, and the end address (C_LVOBU_EA; 4 bytes) of the last video object unit (VOBU) in the cell.

Especially, in this C_PBI, a 1 byte field for setting an erase prohibition flag is assured at a relative byte position (RBP). When "0" is described in this erase prohibition flag field, data can be freely erased; when "1" is described, data is to be permanently kept. This description can be freely made by the user.

The contents of the aforementioned cell category C_CAT will be described. The cell category (C_CAT) indicates the number of cell commands by the lower 8 bits (b0 to b7); the cell still time by the next 8 bits (b8 to b15); the cell type (e.g., karaoke) by the next 5 bits (b16 to b20); an access restriction flag by the next 1 bit (b21); the cell playback mode (e.g., movie or still) by the next 1 bit (b22); a seamless angle change flag by 1 bit (b24) after the next reserved bit; a system time clock (STC) discontinuity flag (to reset STC or not) by the next 1 bit (b25); an interleaved allocation flag (indicating if the cell designated by C_PBI is located in a continuous block or an interleaved block) by the next 1 bit (b26); a seamless playback flag (indicating if the cell designated by C_PBI is to be played back seamlessly) by the next 1 bit (b27); the cell block type (e.g., angle block) by the next two bits (b28 and b29); and the cell block mode (e.g., first cell in the block) by the last two bits (b30 and b31).

If the cell block mode bits are 00b (b means binary), this means that the cell is not the one in the block; if the bits are 01b, the cell is the first one in the block; if the bits are 10b, the cell is the one in the block; and if the bits are 11b, the cell is the last one in the block.

If the cell block type bits are 00b, this indicates that the cell block does not belong to the corresponding block; and if the bits are 01b, the corresponding block is an angle block (a block containing multiangle cells).

If the cell block type bits are not 01b during playback of a title containing multiangle cells, for example, an angle mark (not shown) is kept ON.

On the other hand, if this cell block type=01b is detected during playback, the DVD video recorder can inform the viewer that playback of the angle block is currently in progress by flickering the angle mark (not shown; or by changing the ON color or shape of the angle mark). With such information, the viewer can make sure that an image in another angle pertaining to the picture which is currently being played back is available.

If the interleaved allocation flag is 0b, it indicates that the corresponding cell belongs to a continuous block (that continuously records a plurality of VOBUs); if the interleaved allocation flag is 1b, the corresponding cell belongs to an interleaved block (that interleaved-records ILVUs each containing one or more VOBUs).

If the seamless angle change flag is set (=1b), it represents that the corresponding cell is to be seamlessly played back; if this flag is not set (=0b), the corresponding cell is to be non-seamlessly played back.

That is, if the interleaved allocation flag=1b and seamless angle change flag=0b, the angle can be changed non-seamlessly; if the interleaved allocation flag=1b and seamless angle change flag=1b, the angle can be changed seamlessly.

If a media drive system with a very short access time (a system that can access the beginning of a desired angle block within one video frame period; not limited to an optical disc drive system) is used, the angle can be changed smoothly even when the interleaved allocation flag=0b, i.e., between VOBU sets (different angle cells) which are not interleaved-recorded.

When optical disc 10 with relatively low access speed is used as a recording medium, one recording track of that disc is preferably assigned to recording of one interleaved block. In such format, since the trace destination of an optical head need only move in the radial direction of the disc by a very small distance corresponding to one track width, track jump suffering less time lag (suitable for seamless angle change) can be attained. In this case, if track jump for one video object unit (VOBU) is made, a time lag for a maximum of one revolution of the disc may be produced. Hence, the angle change that requires jumps in units of VOBUs is suitable for non-seamless angle change.

Note that the contents of the seamless angle change flag are normally determined in advance by the provider (the software producer who produces the program contents of titles recorded on DVD disc 10). That is, by determining the contents of the seamless angle change flag in advance, the provider can uniquely determine whether the non-seamless angle change or seamless angle change is to be used.

However, it is technically possible to design the DVD video recorder which allows the viewer (the user of the DVD video recorder to be described later) to arbitrarily change the contents of the seamless angle change flag in read data after cell data of the corresponding title set are read from the optical disc.

Since the seamless angle change flag represents whether the angle information described in navigation pack 86 indicates seamless or non-seamless angle information, if the user has changed this flag, he or she should modify angle information (not shown) in navigation pack 86 (e.g., modification from seamless angle information to non-seamless angle information). In this case, the arrangement of packs constituting the angle should also be modified, accordingly.

When the cell playback mode is 0b, it indicates continuous playback in the cell; if the mode is 1b, still playback in each VOBU present in the cell.

When the user makes recording, playback, and the like, the access restriction flag can be used upon prohibiting direct selection by user operation. For example, when the access restriction flag of a cell that records answers for a collection of questions, the user is prohibited from reading the answers by stealth.

The cell type can indicate the following ones by its 5 bit contents, for example, when the corresponding cell is formed for karaoke.

If the 5 bits are 00000b, no cell type is designated; if the 5 bits are 00001b, a title image of the karaoke is designated; if the 5 bits are 00010b, an introduction part of the karaoke is designated; if the 5 bits are 00011b, a song part other than a climax (bridge) part is designated; if the 5 bits are 00100b, a song part of the first climax part is designated; if the 5 bits are 00101b, a song part of the second climax part is designated; if the 5 bits are 00110b, a song part for a male vocal is designated; if the 5 bits are 00111b, a song part for a female vocal is designated; if the 5 bits are 000b, a song part for mixed voices is designated; if the 5 bits are 01001b, an interlude part (instrumental part) is designated; if the 5 bits are 01010b, fading-in of the interlude part is designated; if the 5 bits are 01011b, fading-out of the interlude part is designated; if the 5 bits are 01100b, the first ending part is designated; and if the 5 bits are 01101b, the second ending part is designated. The contents of the remaining 5 bit code can be used for other purposes.

Note that the angle change can be applied to that for background video data of karaoke. (For example, a full-figure shot, closeup shots of the face and mouth, and the like of a singer who is singing a guide vocal can be angle-changed seamlessly along with the flow of a karaoke music or non-seamlessly by going back some bars, or during repeat playback between desired bars, as the viewer desired.)

On the other hand, if the 8 bit contents of the cell still time are 00000000b, zero still time is designated; if the contents are 11111111b, limitless still time is designated; if the contents fall within the range from 00000001b to 11111110b, a still display time having a duration defined by the decimal value (1 to 254) designated by the contents and expressed in seconds is designated.

The number of cell commands indicates the number of commands to be executed upon completion of playback of the corresponding cell.

FIG. 18 shows the contents of program chain general information PGC_GI.

As shown in FIG. 18, program chain general information PGC_GI describes program chain contents (PGC_CNT), a program chain playback time (PGC_PB_TM), program chain user operation control information (PGC_UOP_CTL), a program chain audio stream control table (PGC_AST_CTLT), a program chain sub-picture stream control table (PGC_SPST_CTLT), program chain navigation control information (PGC_NV_CTL), a program chain sub-picture palette (PGC_SP_PLT), the start address (PGC_CMDT_SA) of a program chain command table, the start address (PGC_PGMAP_SA) of a program chain program map, the start address (C_PBIT_SA) of a playback information table of cells in the program chain, and the start address (C_POSIT_SA) of a position information table of cells in the program chain.

Program chain contents PGC_CNT indicate the number of programs and number of cells (a maximum of 255) in the program chain. In a program chain having no video object VOB, the number of programs is "0".

The program chain playback time (PGC_PB_TM) represents the total playback time of programs in that program chain in hours, minutes, seconds, and the number of video frames. This PGC_PB_TM also describes a flag (tc_flag) indicating the type of video frame, and a frame rate (25 or 30 frames per sec) or the like is designated by the contents of this flag.

Program chain user operation control information PGC_UOP_CTL indicates user operations prohibited in the program chain which is being played back.

Program chain audio stream control table PGC_AST_CTLT can contain control information for each of eight audio streams. Each control information includes a flag (availability flag) indicating if the corresponding audio stream is available in that program chain, and conversion information from an audio stream number to an audio stream number to be decoded.

Program chain sub-picture stream control table PGC_SPST_CTLT includes a flag (availability flag) indicating if that sub-picture stream is available in the corresponding program chain, and conversion information from a sub-picture stream number (32 numbers) into the sub-picture stream number to be decoded.

Program chain navigation control information PGC_NV_CTL includes Next-PGCN indicating the next program chain number to be played back after the program chain which is currently being played back, Previous_PGCN indicating a program chain number (PGCN) quoted by a navigation command "LinkPrevPGC" or "PrevPGC_Search( )", GoUp_PGCN indicating a program chain number to which that program chain is to return, a PG Playback mode indicating the playback mode (sequential playback, random playback, shuffle playback, and the like) of the program, and a Still time value indicating the still time after that program chain is played back.

Program chain sub-picture palette PGC_SP_PLT describes 16 sets of luminance signals and two color difference signals used in a sub-picture stream in that program chain.

Start address PGC_CMDT_SA of the program chain command table assures a description area for a pre-command executed before PGC playback, a post-command executed after PGC playback, and a cell command executed after cell playback.

Start address PGC_PGMAP_SA of the program chain program map describes the start address of program map PGC_PGMAP representing the program configuration in the program chain by a relative address from the first byte of program chain information PGCI.

Start address C_PBIT_SA of the cell playback information table in the program chain describes the start address of cell playback information table C_PBIT that determines the playback order of cells in that program chain by a relative address from the first byte of program chain information PGCI.

Start address C_POSIT_SA of the position information table of cells in the program chain describes the start address of cell position information table C_POSIT indicating VOB identification numbers and cell identification numbers used in that program chain by a relative address from the first byte of program chain information PGCI.

Figure 19:
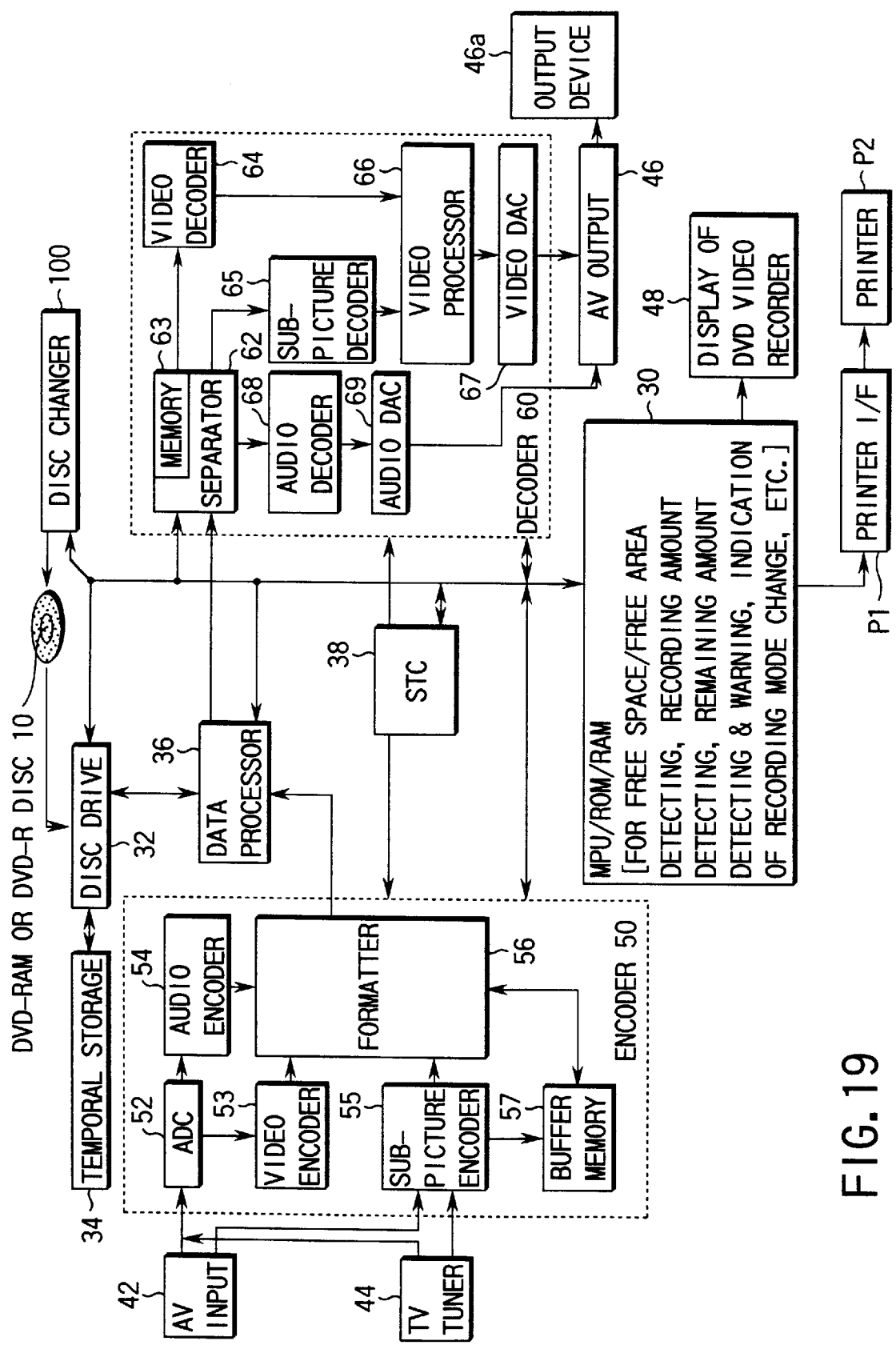
FIG. 19 is a block diagram for explaining the arrangement of an apparatus (DVD video recorder) for recording/playing back digital moving picture information at a variable recording rate using the information with the structures described with reference to FIGS. 3 to 18 on the disc in FIG. 1.

FIG. 19 shows an example of the arrangement of an apparatus (DVD video recorder) for recording and playing back digital moving picture information on and from a disc shown in FIG. 1 at a variable recording rate using information with the structure described above with reference to FIGS. 3 to 18.

The apparatus main body of the DVD video recorder shown in FIG. 19 is roughly constructed by a disc drive unit (32, 34, and the like) for rotating DVD-RAM or DVD-R disc 10, and reading/writing information to/from disc 10, encoder 50 on the recording side, decoder 60 on the playback side, and microcomputer block 30 for controlling operations of the apparatus main body.

Encoder 50 comprises ADC (analog-to-digital converter) 52, video encoder (V encoder) 53, audio encoder (A encoder) 54, sub-picture encoder (SP encoder) 55, formatter 56, and buffer memory 57.

ADC 52 receives an external analog video signal+external analog audio signal from AV input 42, or an analog TV signal+analog audio signal from TV tuner 44. ADC 52 converts the input analog video signal into a digital signal at sampling frequencies of, e.g., 13.5 MHz/6.75 M and 8 quantization bits. (That is, luminance component Y at a sampling frequency of 13.5 M, color difference component Cr (or Y-R) at a sampling frequency of 6.75 M, and color difference component Cb (or Y-B) at a sampling frequency of 6.75 M are respectively quantized, with the ratio of 4:2:2, by 8 bits). Incidentally, all components Y, Cr and Cb may be sampled with 13.5 M, so that they are quantized, in the ratio of 4:4:4, by 8 bits.

Similarly, ADC 52 converts the input analog audio signal into a digital signal at a sampling frequency of, e.g., 48 kHz and 16 quantization bits.

When an analog video signal and digital audio signal are input to ADC 52, the digital audio signal passes through ADC 52. (The digital audio signal may be subjected to processing for reducing jitter alone, processing for changing the sampling rate or the number of quantization bits, and the like without changing its contents.)

On the other hand, when a digital video signal and digital audio signal are input to ADC 52, these signals pass through ADC 52 (these signals may also be subjected to jitter reduction, sampling rate change processing, and the like without changing their contents).

A digital video signal component output from ADC 52 is supplied to formatter 56 via video encoder (V encoder) 53. Also, a digital audio signal component output from ADC 52 is supplied to formatter 56 via audio encoder (A encoder) 54.

V encoder 53 has a function of converting the input digital video signal into a digital signal compressed at a variable bit rate by MPEG2 or MPEG1.

A encoder 54 has a function of converting the input digital audio signal into a digital signal compressed at a fixed bit rate (or linear PCM digital signal) by MPEG or AC-3.

When a DVD video signal with the data structure shown in FIGS. 11 and 12 is input from AV input 42 (e.g., a signal coming from a DVD video player with a dedicated sub-picture signal output terminal), or when a DVD video signal with such data structure is broadcasted and received by TV tuner 44, a sub-picture signal component (sub-picture pack) in the DVD video signal is input to sub-picture encoder (SP encoder) 55. Sub-picture data input to SP encoder 55 is arranged into a predetermined signal format, and is then supplied to formatter 56.

Formatter 56 performs predetermined signal processing for the input video signal, audio signal, sub-picture signal, and the like while using buffer memory 57 as a work area, and outputs recording data that matches the format (file structure) described above with reference to FIGS. 3 to 18 to data processor 36.

The contents of standard encoding for generating the recording data will be briefly explained. That is, when encoder 50 shown in FIG. 19 starts encoding, parameters required for encoding video (main picture) data and audio data are set. The main picture data is pre-encoded using the set parameters to calculate an optimal code amount distribution for a predetermined average transfer rate (recording rate). Based on the code amount distribution obtained by pre-encoding, the main picture data is encoded. At this time, the audio data is encoded at the same time.

As a result of pre-encoding, when data compression is insufficient (when a desired video program cannot be stored in a DVD-RAM or DVD-R disc used to record data), if pre-encoding can be done again (for example, if the recording source is the one capable of repetitive playback such as a video tape, video disc, or the like), the main picture data is partially re-encoded, and the re-encoded main picture data portion replaces the previously pre-encoded main picture data portion. With a series of such processes, the main picture data and audio data are encoded, and the average bit rate value required for recording is reduced largely.

Likewise, parameters required for encoding the sub-picture data are set, and encoded sub-picture data is generated.

The encoded main picture data, audio data, and sub-picture data are combined and converted into the structure of video title set VTS.

That is, cells as minimum units of the main picture data (video data) are set, and the cell playback information (C_PBI) is generated. Then, the structure of cells that construct a program chain shown in FIG. 8, attributes of main picture, sub-picture, and audio data, and the like are set (some of these attributes use information obtained upon encoding the individual data), and information management table information (VMGI_MAT in FIG. 15 and VTSI_MAT in FIG. 16) containing various kinds of information is created.

The encoded main picture data, audio data, and sub-picture data are segmented into packs each having a predetermined size (2,048 bytes) shown in FIG. 12, and dummy packs are appropriately inserted into these packs. Packs other than the dummy packs describe time stamps such as a PTS (presentation time stamp), DTS (decode time stamp), and the like. As for the PTS of sub-picture data, a time arbitrarily delayed from that of main picture data or audio data in the same playback time zone can be described.

The data cells are arranged while adding navigation pack 86 at the beginning of each VOBU 85 so as to play back data in the order from their time codes, thus forming VOB 83 constructed by a plurality of cells, as shown in FIG. 11. VOBS 82 containing one or more VOBs 83 is formatted to the structure of VTS 72 shown in FIG. 8.

When a DVD playback signal is digitally copied from a DVD video player, since the contents of cells, program chain, management tables, time stamps, and the like are predetermined, they need not be generated again. (When a DVD video recorder is designed to digitally copy a DVD playback signal, copyright protection means such as an electronic watermark, and the like must be taken.)

The disc drive unit that writes/reads (records/plays back) information to/from DVD disc 10 comprises disc changer 100, disc drive 32, temporal storage 34, data processor 36, and system time counter (or system time clock; STC) 38.

Temporal storage 34 is used for buffering a predetermined amount of those of data to be written in disc 10 via disc drive 32 (i.e., data output from encoder 50), and for buffering a predetermined amount of those of data played back from disc 10 via disc drive 32 (i.e., data input to decoder 60).

For example, when temporal storage 34 is comprised of a 4 Mbyte semiconductor memory (DRAM), it can buffer recording or playback data for approximately 8 sec at an average recording rate of 4 Mbps. On the other hand, when temporal storage 34 is comprised of a 16 Mbyte EEPROM (flash memory), it can buffer recording or playback data for approximately 30 sec at an average recording rate of 4 Mbps. Furthermore, when temporal storage 34 is comprised of a 100 Mbyte very compact HDD (hard disc), it can buffer recording or playback data for 3 min or more at an average recording rate of 4 Mbps.

Temporal storage 34 can also be used for temporarily storing recording information until disc 10 is exchanged by a new one, when disc 10 has been fully recorded during recording.

Temporal storage 34 can be used for temporarily storing data excessively read out from the drive within a predetermined period of time when disc drive 32 uses a high-speed drive (double-speed or higher). When read data upon playback is buffered on temporal storage 34, even when an optical pickup (not shown) has produced read errors due to a vibration shock or the like, playback data buffered on temporal storage 34 can be used alternatively, thus preventing a played back picture from being interrupted.

When the DVD video recorder has an external card slot (not shown in FIG. 19), the EEPROM may be sold as an optical IC card. On the other hand, when the DVD video recorder has an external drive slot or SCSI interface, the HDD can be sold as an optical expansion drive.

Data processor 36 in FIG. 19 supplies DVD recording data output from encoder 50 to disc drive 32, receives a DVD playback signal played back from disc 10 via drive 32, rewrites management information (the directory records described subsequent to FIG. 10, VMGI_MAT in FIG. 15, VTSI_MAT in FIG. 16, and the like) recorded in disc 10, and erases data (files or VTS) recorded on disc 10 under the control of microcomputer block 30.

Microcomputer block 30 includes an MPU (or CPU), a ROM written with control programs and the like, and a RAM that provides a work area required for executing programs.

The MPU in microcomputer block 30 (to be also referred to as MPU 30 hereinafter) executes free space detection, recording amount (the number of recorded packs) detection, remaining amount detection, warning, recording mode change instruction, and other processes using the RAM as a work area in accordance with the control programs stored in the ROM.

Of the execution results of MPU 30, the contents that the DVD video recorder user is informed of are displayed on display 48 of the DVD video recorder, or are displayed on a monitor display in an on-screen display (OSD) mode.

The control timings of disc changer 100, disc drive 32, data processor 36, and encoder 50 and/or decoder 60 by MPU 30 can be determined based on time data output from STC 38 (recording and playback are normally done in synchronism with time clocks from STC 38, but other processes may be executed at timings independently of STC 38).

Decoder 60 comprises separator 62 for separating and extracting packs from DVD playback data with the pack structure shown in FIG. 11, memory 63 used upon signal processes such as pack separation and the like, video decoder (V decoder) 64 for decoding main picture data (the contents of video pack 88 in FIG. 11) separated by separator 62, sub-picture data decoder (SP decoder) 65 for decoding sub-picture data (the contents of sub-picture pack 90 shown in FIG. 11) separated by separator 62, audio decoder (A decoder) 68 for decoding audio data (the contents of audio pack 91 in FIG. 11) separated by separator 62, video processor 66 for appropriately synthesizing sub-picture data output from SP decoder 65 with video data output from V decoder 64, and outputting main picture data with superimposed sub-picture data such as menus, highlight buttons, superimposed dialog, and the like, video digital-to-analog converter (V·DAC) 67 for converting a digital video output from video processor 66 into an analog video signal, and audio digital-to-analog converter (A·DAC) 67 for converting a digital audio output from A decoder 68 into an analog audio signal.

The analog video signal output from V·DAC 67 and analog audio signal from A·DAC 69 are supplied to output device 46a (not shown; a multichannel stereophonic apparatus having two to six channels+monitor TV or projector) via AV output 46.

OSD data output from MPU 30 is input to separator 62 of decoder 60, and is then input to video processor 66 through V decoder 64 (without being decoded). The OSD data is superimposed on main picture data, and these data are supplied to an external monitor TV connected to AV output 46. Then, a warning message is displayed together with a main picture.

MPU 30 is connected to printer interface P1. Printer interface P1 is connected to printer P2. Printer P2 prints out images based on various data played back from optical disc 10 to predetermined locations (an optical disc, a label added to an optical disc, a cartridge which stores an optical disc, and the like).

When the user has pressed open/close button 5g of remote controller (to be described later with reference to FIG. 20), a disc tray (not shown) is opened toward the user side.

DVD-RAM or DVD-RW disc (a cartridge containing a disc) 10 or DVD-R disc (bear disc) 10 used in recording is set on this disc tray.

Subsequently, when the user has pressed open/close button 5g on remote controller 5, disc tray door 202 is closed, and disc (e.g., DVD-RW) set on the tray is loaded into disc drive 32 in apparatus main body 200.

Then, disc drive 32 is automatically started, and MPU 30 reads physical format information (including disc structure data, free space data of a blank disc, and the like). After that, MPU 30 reads a video manager information management table (including information FREE_SPACE indicating a practical free space, and the like) shown in FIG. 15, and a video title set information management table (including PLAY_END Flag indicating whether or not a specific title set has already been played back, ARCHIVE Flag indicating whether or not a specific title set is to be permanently kept, and the like) shown in FIG. 17.

When set disc 10 is a new DVD-RW disc (or DVD-RAM disc), an item "DVD-RW" (or "DVD-RAM") on display 48 of the DVD video recorder is being prominented in an easy-to-see manner. Also, a recording time "00 (hour):00 (min):00 (sec)" is displayed, and a recording title/chapter "00-00" is displayed (once recording has been done, the recording title/chapter display changes like "01-01").

If the apparatus default or user setup indicates a recording mode=MPEG2 and a recording average bit rate=4 Mbps, items "MPEG2" and "4 Mbps" are displayed on display 48 to stand out.

Furthermore, when recording on set disc 10 has progressed, and the recordable time on that disc 10 becomes small (e.g., 5 min), MPU 30 detects it, and an item "DISK TO BE CHANGED" that prompts the user to exchange the disc is displayed on display 48 in an easy-to-see manner.

The front panel of DVD video recorder main body 200 also has basic operation keys such as a power switch button, open/close key, playback key, stop key, chapter/program skip key, rewind key, fastforward key, recording start button (not shown), and the like.

The above-mentioned item "DISK TO BE CHANGED" begins to be lit up or flicker slightly before disc 10 set in the apparatus main body is used up during recording. After that when the remaining amount of disc 10 becomes zero, recording automatically proceeds to one or more DVD-RW disc 10 set in external disc changer 100.

Alternatively, two or more DVD video recorders may be prepared, and their MPUs 30 may be connected by daisy chain via a communication cable to attain relay recording using two or more DVD video recorders. In such-case, it is possible that "the first recorder can record using MPEG2/ average bit rate=4 Mbps for 1 hour, and the second recorder can record using MPEG2/average bit rate=2 Mbps for 2 hours".

In case of relay recording using a plurality of DVD video recorders, a message "recorder A records using MPEG2/ average bit rate=4 Mbps for 1 hour, and recorder B records using MPEG2/average bit rate=2 Mbps for 2 hours" may be displayed on the monitor screen.

Note that the DVD video recorder shown in FIG. 19 does not record any warning or messages to the user on disc 10.

However, recording information (recording average bit rate, recording channel number, recording date/time, and the like) exemplified on the lower portion of the monitor screen may be recorded on disc 10 for several seconds immediately after the beginning of recording.

Figure 20:
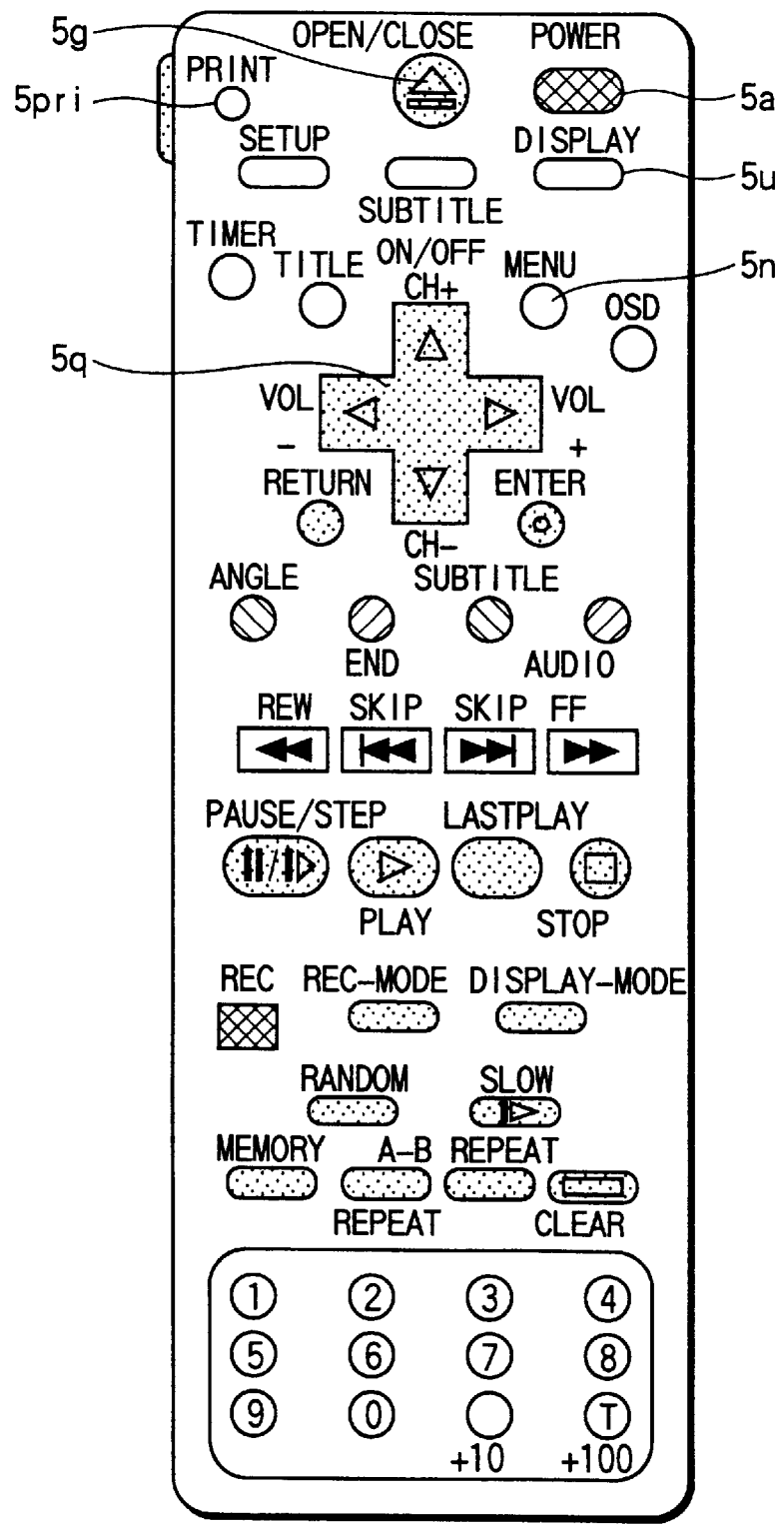
FIG. 20 is a view showing an example of a remote controller for operating the DVD video recorder in FIG. 19.

FIG. 20 shows an example of remote controller 5 used for operating the DVD video recorder shown in FIG. 19. Remote controller 5 shown in FIG. 20 has various keys such as power key 5a, open/close key 5g, menu key 5n, select/cursor key 5q, display key 5u, and print key 5pri.

Power key 5a is literally used to turn on/off the power supply. Open/close key 5g is used to open/close disc tray 202 (not shown) mounted on apparatus main body 200 of the DVD video recording shown in FIG. 19. Menu key 5n is used to play back/display root menus recorded on a disc and selected menus. Select/cursor key 5q is used to select various items. Display key 5u is used to display various pieces of information on display 48. The function of print key 5pri will be explained in detail below.

A representative frame will be described.

Video object DA22 of optical disc 10 includes moving picture data constructing a plurality of chapters (first, second, . . . , nth chapters). This moving picture data includes a plurality of picture data corresponding to a plurality of frames. The plurality of frames include representative frames each representing a corresponding chapter. The representative frame is a frame to be reduced for the following reason. The representative frame is also a frame to be printed. Picture data corresponding to this representative frame is the above-described representative picture data. That is, information indicating the storage location of the representative picture data is start address data INFO11 and length data INFO12.

The relationship between a main frame and subframe will be explained.

Moving picture data included in video object DA22 of optical disc 10 is data compressed by a compression format determined by MPEG2. This moving picture data includes base picture data corresponding to a base picture (I picture: Intra-Picture), and change data indicating a change (motion) in base picture. The base picture data included in the moving picture data forms a main frame, and the change data forms a subframe. The subframe is a picture subsequent to the main frame. That is, main picture data (base picture data) corresponding to the main frame, and sub-picture data corresponding to the subframe are played back in this order. In this embodiment, for example, the representative frame corresponds to the main frame. In other words, information indicating the storage location of main picture data corresponding to the main frame is start address data INFO11 and length data INFO12.

The skip playback function will be explained.

The digital information recording/playback system has a function (skip playback function) of playing back moving picture data from a predetermined position (predetermined chapter). To realize this skip playback function, picture object DA23 of optical disc 10 records menu frame information for creating a skip playback menu frame. When the digital information recording/playback system receives a menu display instruction via menu key 5n of remote controller 5, it reads menu frame information from optical disc 10 and displays a skip playback menu frame on output device (monitor or the like) 46a based on this menu frame information.

The skip playback menu frame includes the first representative frame representing the first chapter, the second representative frame representing the second chapter, . . . , and the nth representative frame representing the nth chapter. In displaying the skip playback menu frame, the digital information recording/playback system reads start address data INFO11 and length data INFO12 and reads out representative picture data from the storage location of the representative picture data. This representative picture data is reduced to display a representative frame of each chapter on the skip playback menu frame. At this time, if the digital information recording/playback system receives designation of a predetermined representative frame via select key/cursor key 5q of remote controller 5, it starts playing back moving picture data from a chapter corresponding to the predetermined representative frame. In this way, the skip playback function is realized.

Printing of information about the recording contents of optical disc 10 will be described.

According to the present invention, information about the recording contents of optical disc 10 is printed on the surface of optical disc 10, a cartridge which stores optical disc 10, or a label added to optical disc 10. This allows the user to obtain information about the recording contents of optical disc 10 without playing back optical disc 10. Information about the recording contents of optical disc 10 corresponds to representative picture data equivalent to a representative frame (a frame to be printed or main frame). Information about the recording contents of optical disc 10 also includes picture information INFO7 (recording date information INFO71, recording channel information INFO72, white balance information INFO73, zoom ratio information INFO74, shutter speed information INFO75, and GPS information INFO76). Further, information about the recording contents of optical disc 10 also includes amount information 271 (total amount information 2711 and free area information 2712), and rewrite count information 701.

Figure 21:
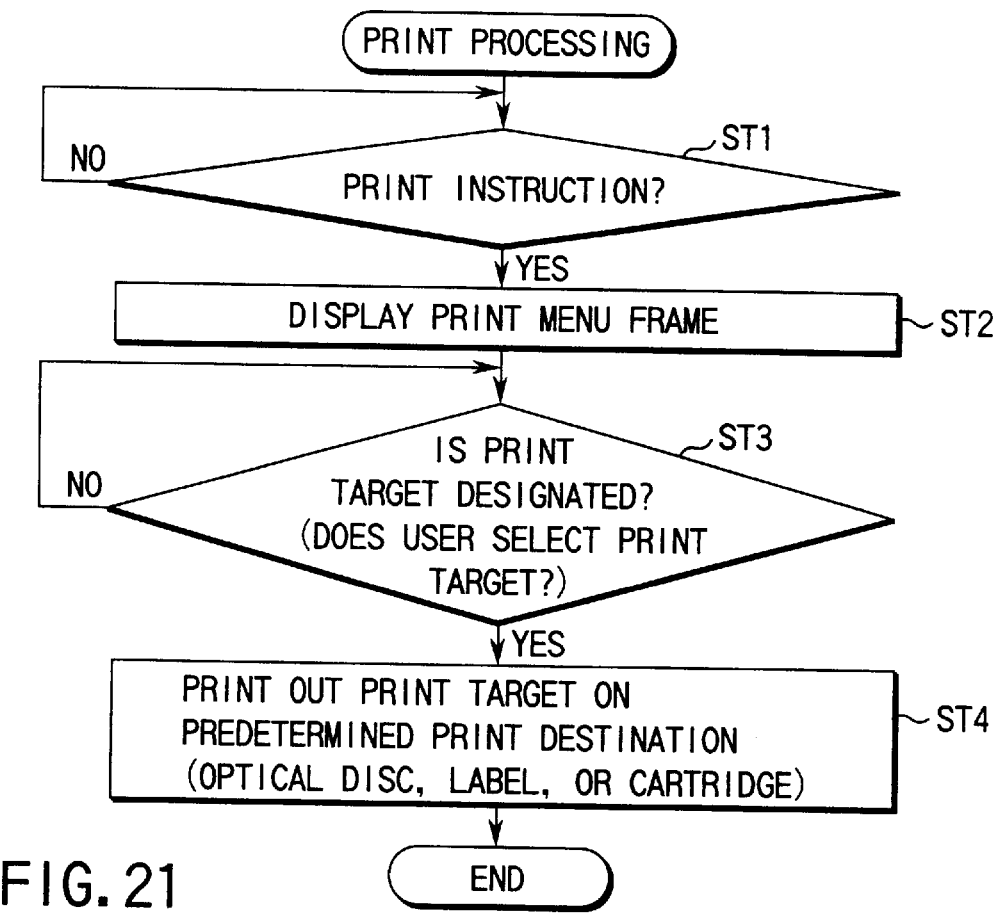
FIG. 21 is a flow chart for explaining printing of information about the recording contents of the optical disc.

Printing of information about the recording contents of optical disc 10 will be explained with reference to a flow chart in FIG. 21.

The digital information recording/playback system has a function (recording-related matter printing function) of printing information about the recording contents of optical disc 10. To realize this recording-related matter printing function, volume/file management information 70 of optical disc 10 records menu frame information for creating a print menu frame. When the digital information recording/playback system receives a recording-related matter print instruction via print key 5pri of remote controller 5 (YES in ST1), it reads menu frame information from optical disc 10 and displays a print menu frame on output device 46a based on this menu frame information (ST2).

Print targets are displayed on the print menu frame. That is, representative frames (first, second, . . . , nth representative frames), picture information INFO7 (recording date information INFO71, recording channel information INFO72, white balance information INFO73, zoom ratio information INFO74, shutter speed information INFO75, and GPS information INFO76), amount information 271 (total amount information 2711 and free area information 2712), rewrite count information 701, and the like are displayed on the print menu frame. In displaying the print menu frame, the digital information recording/playback system reads start address data INFO11 and length data INFO12 and reads out representative picture data form the storage location of the representative picture data. This representative picture data is reduced to display a representative frame of each chapter on the print menu frame. In displaying the print menu frame, the digital information recording/playback system reads picture information INFO7 (recording date information INFO71, recording channel information INFO72, white balance information INFO73, zoom ratio information INFO74, shutter speed information INFO75, and GPS information INFO76), amount information 271 (total amount information 2711 and free area information 2712), and rewrite count information 701. The digital information recording/playback system displays the read information on the print menu frame.

If the digital information recording/playback system receives designation of a print target via the operation panel after the print menu frame is displayed on output device 46a (YES in ST3), it instructs the printer to print the designated print target. The printer executes image formation based on data of the designated print target in accordance with this instruction. That is, the printer prints the designated print target to a predetermined print destination (ST4). The print destination at this time is the surface of optical disc 10, a cartridge which stores optical disc 10, a label added to optical disc 10, or the like.

Figure 22:
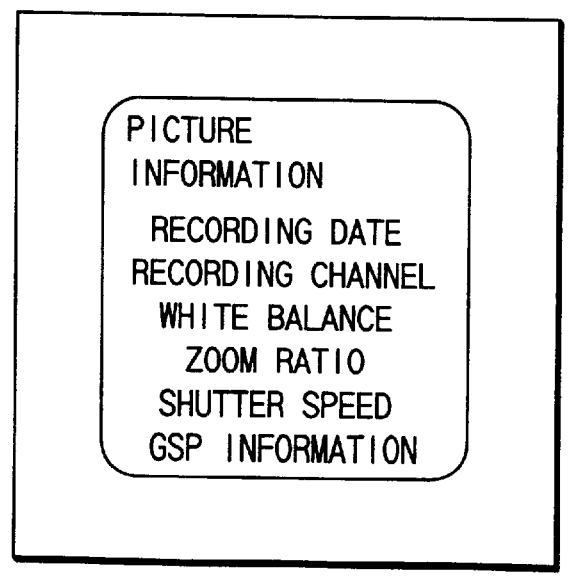
FIG. 22 is a view showing the state in which picture information is printed on a label added to the optical disc and cartridge.

FIG. 22 is a view showing the state in which picture information INFO7 (recording date information INFO71, recording channel information INFO72, white balance information INFO73, zoom ratio information INFO74, shutter speed information INFO75, and GPS information INFO76) is printed on a label added to optical disc 10 and cartridge 11.

Figure 23A:
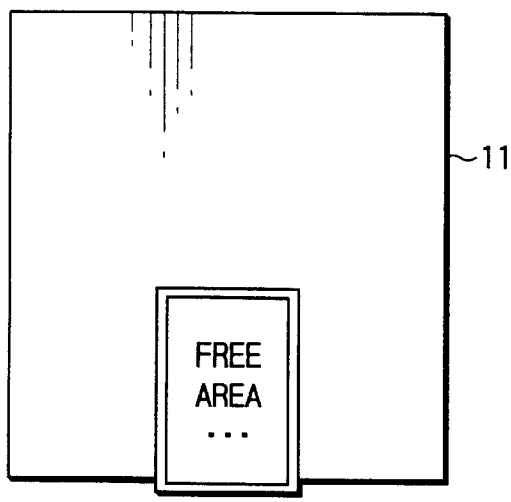
FIGS. 23A, 23B, and 23C are views showing the state in which amount information is printed on a label added to the cartridge.
Figure 23B:
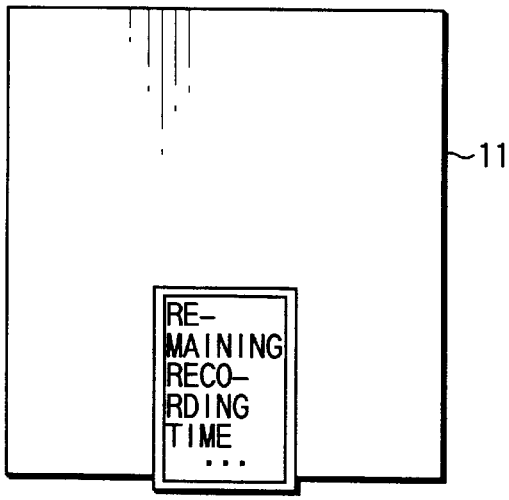
Figure 23C:
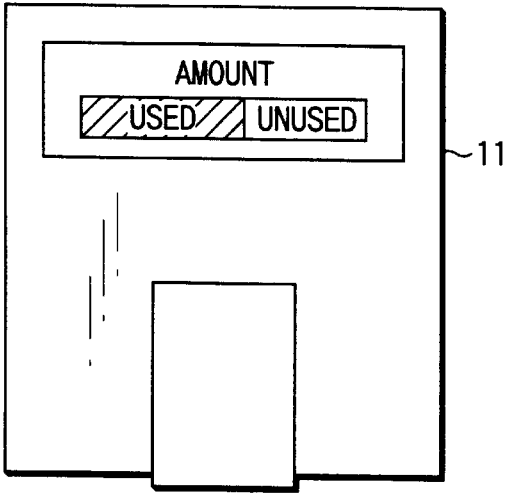

FIGS. 23A, 23B, and 23C are views showing the state in which amount information 271 (total amount information 2711 and free area information 2712) is printed on a label added to cartridge 11. FIG. 23A is a view showing the state in which amount information 271 (free area) is numerically represented. FIG. 23B is a view showing the state in which amount information 271 (remaining recording time) is numerically represented. The recording time changes in accordance with the compression ratio of image data recorded on optical disc 10, so an accurate remaining recording time cannot be obtained from a free area. In this case, an approximate remaining recording time is printed. FIG. 23C is a view showing the state in which amount information 271 (free area) is illustrated. By representing used and unused amounts in contrast with each other, as shown in FIG. 23C, the user can visually check the storage amount.

Figure 24A:
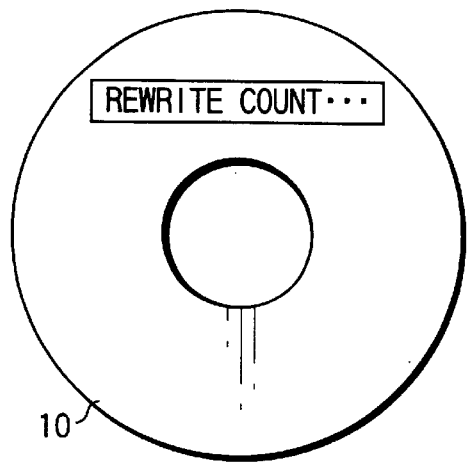
FIGS. 24A and 24B are views showing the state in which rewrite count information is printed on a label added to the optical disc.
Figure 24B:
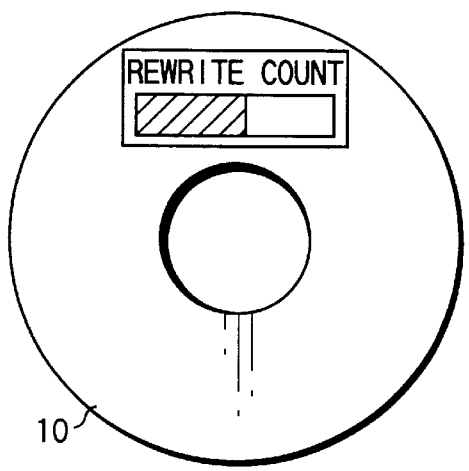

FIGS. 24A and 24B are views showing the state in which rewrite count information 701 is printed on a label added to optical disc 10. Data is assumed to be frequently rewritten on an optical disc such as DVD-RAM. However, the number of rewrite operations is limited, and if the rewrite count exceeds a given count, a write disable area is generated. The write disable area is replaced, but too many write disable areas result in a short of the data recording time owing to replacement and data recording errors. To make the user know this in advance, the rewrite count is printed. FIG. 24A is a view showing the state in which rewrite count information 701 is numerically represented. FIG. 24B is a view showing the state in which rewrite count information 701 is illustrated.

According to the present invention, an information recording medium processing apparatus which can easily display information about the recording contents of an information recording medium without any playback and cumbersome processing of the information recording medium (optical disc) can be provided.

According to the present invention, an information recording medium which can contribute to easy display of information about the recording contents of the information recording medium without any playback and cumbersome processing of the information recording medium (DVD-RAM disc).

A modification of the embodiment mentioned above will be described with reference to FIGS. 25 to 31. In the above embodiment, start address data INFO11 and length data INFO12 shown in FIG. 7 indicate the storage location of a representative picture included in video object DA22 shown in FIG. 3. However, the present invention is not limited to this, and the storage location of the representative picture may be indicated as follows.

<1>General Description of Data Structure of Information Recording Medium (Optical Disk 1001)

Figure 25:
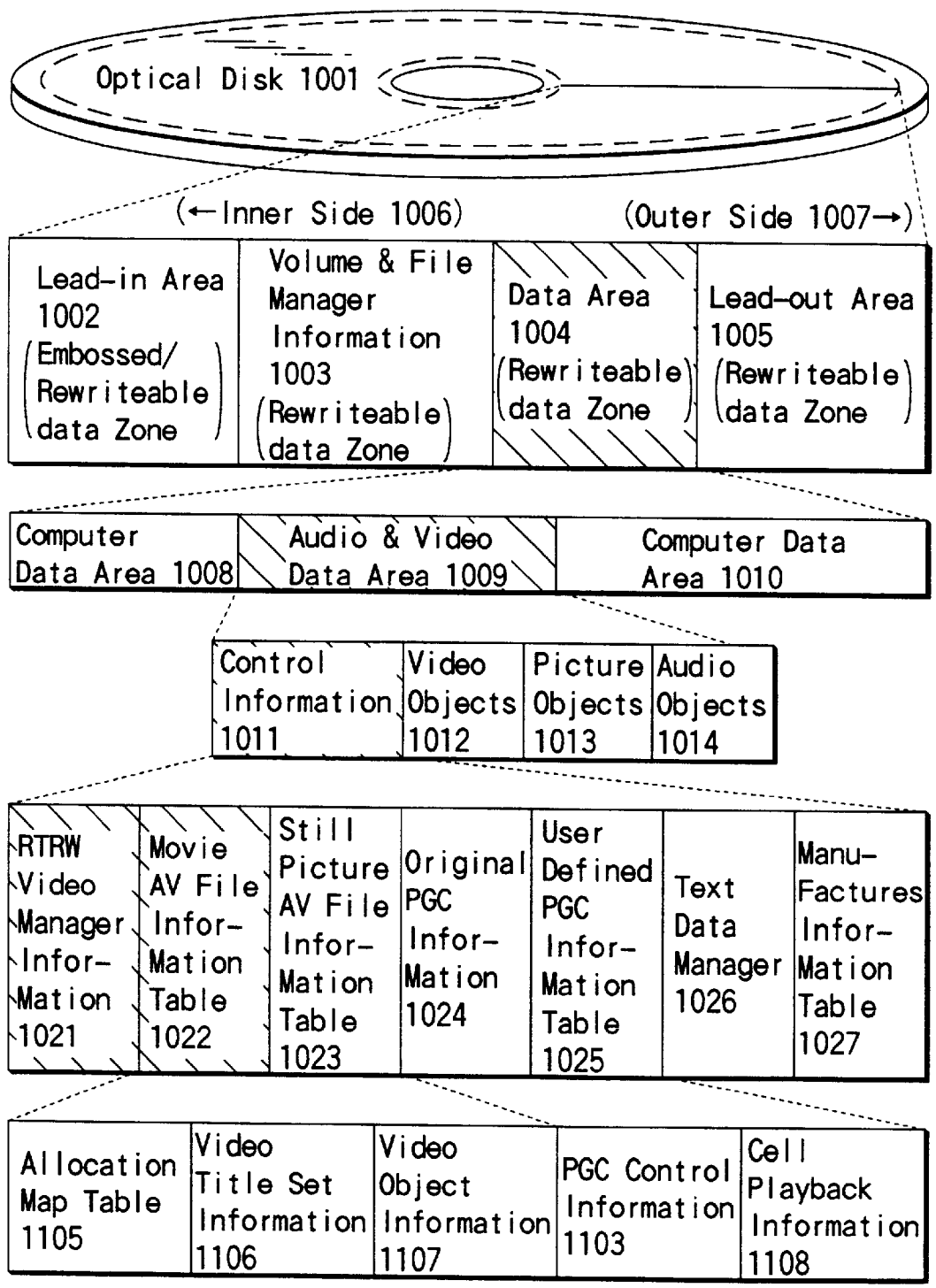
FIG. 25 is a view schematically showing a data structure recorded on the optical disc in a modification.

Data (video data, audio data, and the like) recorded on optical disc 1001 shown in the uppermost stage in FIG. 25 has a structure shown in the second stage in FIG. 25 from inner side 1006 to outer side 1007. The data structure shown in the second stage in FIG. 25 has details shown in the third, fourth, fifth, and sixth stages in FIG. 25.

More specifically, as shown in FIG. 25, optical disc 1001 includes lead-in area 1002, volume & file manager information 1003, data area 1004, and lead-out area 1005. Lead-in area 1002 includes an embossed data zone having an uneven optical reflection surface, a mirror zone having a flat surface (mirror surface), and a rewritable data zone capable of information rewrite. Volume & file manager information 1003 includes a rewritable data zone capable of recording/rewriting an audio & video data file or information about the total volume by the user. Data area 1004 includes a rewritable data zone capable of recording/rewriting data by the user. Lead-out area 1005 includes a rewritable data zone capable of information rewrite.

The embossed data zone of lead-in area 1002 records in advance information about the whole disc, information about recording, playback, and erase characteristics, and information about the manufacture of the disc. Information about the whole disc is information such as the disc type (DVD-ROM, DVD-RAM, DVD-R, or the like), the disc size, the recording density, the physical sector number (PSN) indicating the recording start/end position, and the like. Information about recording, playback, and erase characteristics is information such as the recording power, the recording pulse width, the erase power, the playback power, the recording/erase linear velocity, and the like. Information about the manufacture of the disc is information about the manufacture of each disc such as the manufacturing number.

The rewritable data zones of lead-in and lead-out areas 1002 and 1005 have unique disc name recording areas for respective information recording media, test recording areas (for confirming recording/erase conditions), and management information recording areas about defective areas in data area 1004. These areas allow recording by the information recording/playback system.

As shown in FIG. 25, data area 1004 sandwiched between lead-in and lead-out areas 1002 and 1005 allows mixed recording of computer data and audio & video data. The recording order and recording information sizes of computer data and audio & video data can be arbitrarily set. Areas which record computer data will be called computer data areas 1008 and 1010, and an area which records audio & video data will be called audio & video data area 1009.

As shown in FIG. 25, audio & video data area 1009 includes control information 1011, video objects 1012, picture objects 1013, and audio objects 1014. Control information 1011 is control information necessary for processes such as picture recording (sound recording), playback, editing, and search. Video objects 1012 are contents (recording information) of video data. Picture objects 1013 are still picture information such as still pictures and slide pictures. Audio objects 1014 are contents (sound recording information) of audio data.

Video objects 1012, picture objects 1013, and audio objects 1014 shown in FIG. 25 mean information groups classified in units of contents (data contents). All video data recorded in audio & video data area 1009 are included in video objects 1012, all pieces of still picture information are included in picture objects 1013, and all audio-sound data are included in audio objects 1014.

Figure 27:
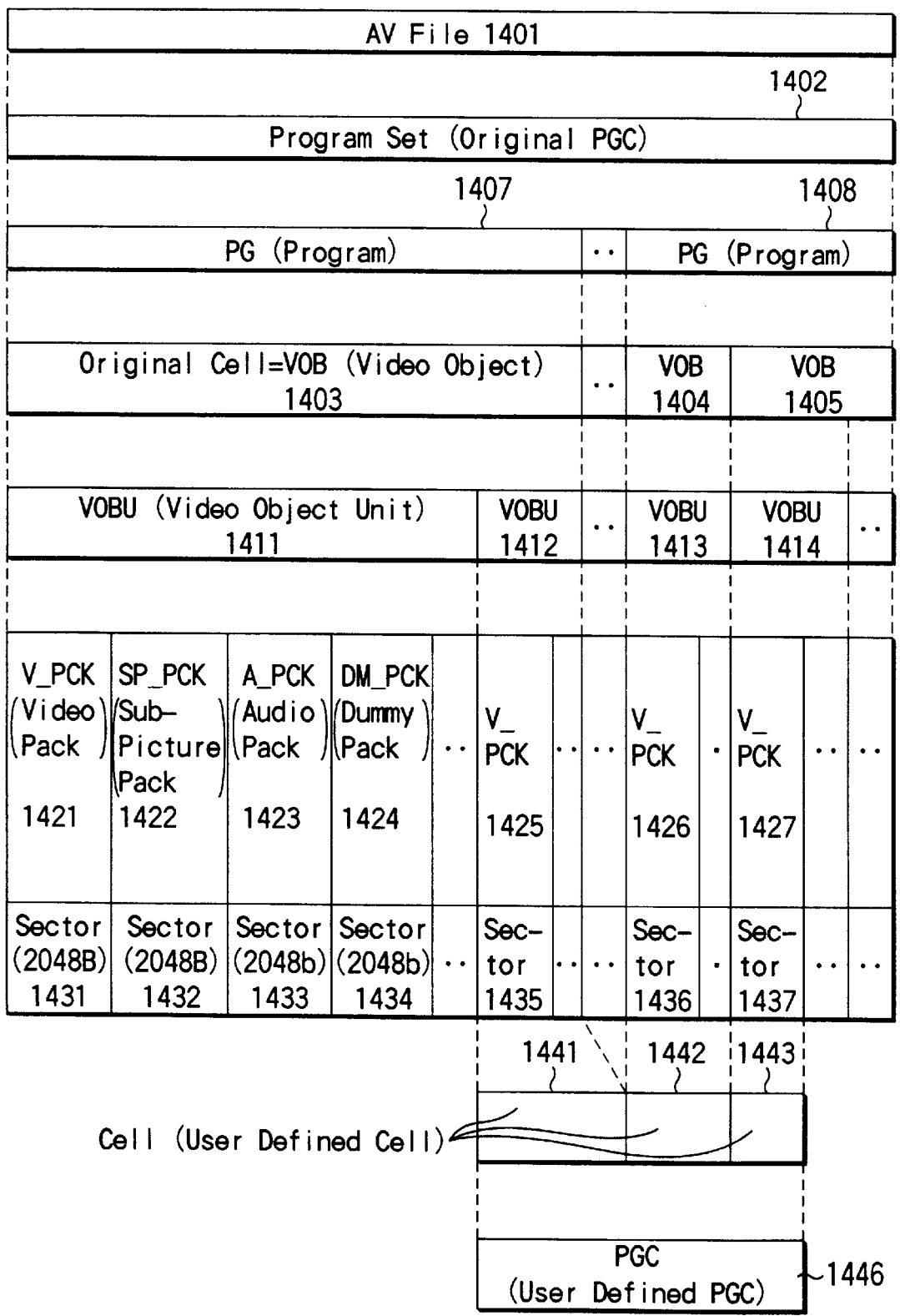
FIG. 27 is a view schematically showing a data structure in an AV file.

Original cell=VOB (video object) 1403 shown in FIG. 27 represents a set of pieces of information recorded in AV file 1401, and has a definition different from that of video objects 1012 shown in FIG. 25. These terms are similar but used with different meanings.

As shown in FIG. 25, control information 1011 includes RTRW video manager information (RTRW_VMGI) 1021, movie AV file information table (M_AVFIT) 1022, still picture AV file information table (S_AVFIT) 1023, original PGC information (ORG_PGCI) 1024, user defined PGC information table (ORG_PGCI) 1025, text data manager (TXT_DT_MG) 1026, and manufactures information table (MNFIT) 1027. RTRW video manager information (RTRW_VMGI) 1021 is common to all RTR (Real Time Recording) shown in FIG. 26, and includes information indicating the storage destination of a representative picture. The representative picture is used as a picture to be printed on a disc label (a picture representing the recording contents of a disc). Alternatively, when a plurality of discs are handled in an autochanger or multi-disc pack, the representative picture is used as a picture representing the recording contents of a disc loaded into the disc drive (a picture displayed as a preview on the display). Movie AV file information table (M_AVFIT) 1022 and still picture AV file information table (S_AVFIT) 1023 manage data structures in video object 1012, and information about recording positions on optical disc 1001. Original PGC information (ORG_PGCI) 1024 and user defined PGC information table (ORG_PGCI) 1025 have control information necessary for playback. Text data manager (TXT_DT_MG) 1026 and manufactures information table (MNFIT) 1027 correspond to additional recording/playback information.

As shown in FIG. 25, movie AV file information table (M_AVFIT) 1022 and still picture AV file information table (S_AVFIT) 1023 include allocation map table 1105, video title set information 1106, and video object information 1107. Original PGC information (ORG_PGCI) 1024 and user defined PGC information table (ORG_PGCI) 1025 include PGC control information 1103 and cell playback information 1108. Allocation map table 1105 records information about address setting along practical allocation on optical disc 1001 and identification of recorded and unrecorded areas. Video title set information 1106 represents the overall information in AV file 1401 shown in FIG. 27, and includes link information between VOBs, grouping information of a plurality of VOBs for management and search, and time information such as a time map table. As shown in FIG. 27, video object information 1107 represents information about each VOB in AV file 1401, and includes attribute (characteristic) information for each VOB and information about each video object unit (VOBU) contained in the VOB. PGC control information 1103 includes information about a video data playback program (sequence). Cell playback information 1108 includes information about the data structure of a basic video data unit for playback.

The structure in FIG. 25 has been schematically explained, and each information will be slightly supplementally explained.

Volume & file manager information 1003 records information about the total volume, the number of PC data files, the number of AV data files, and recording layer information.

In particular, as the recording layer information, the following information is recorded to process a multi-disc pack or two-layered RAM/ROM disc as one large volume space by setting successive logical sector numbers.

The number of constituent layers (e.g., one two-layered RAM/ROM disc is counted as two layers, one two-layered ROM disc is counted as two layers, and n single-sided discs are counted as n layers.)

A logical sector number range table assigned to each layer (the amount of each layer)

The type of each layer (e.g., a DVD-RAM disc, a RAM portion of a two-layered RAM/ROM disc, a CD-ROM, a CD-R, or the like)

A logical sector number range table assigned in units of zones in the RAM area of each layer (also including rewritable area amount information of each layer)

ID information unique to each layer (to check disc exchange in a multi-disc pack)

<2> Directory Structure of Data File in Data Area 1004

Figures 26, 28:
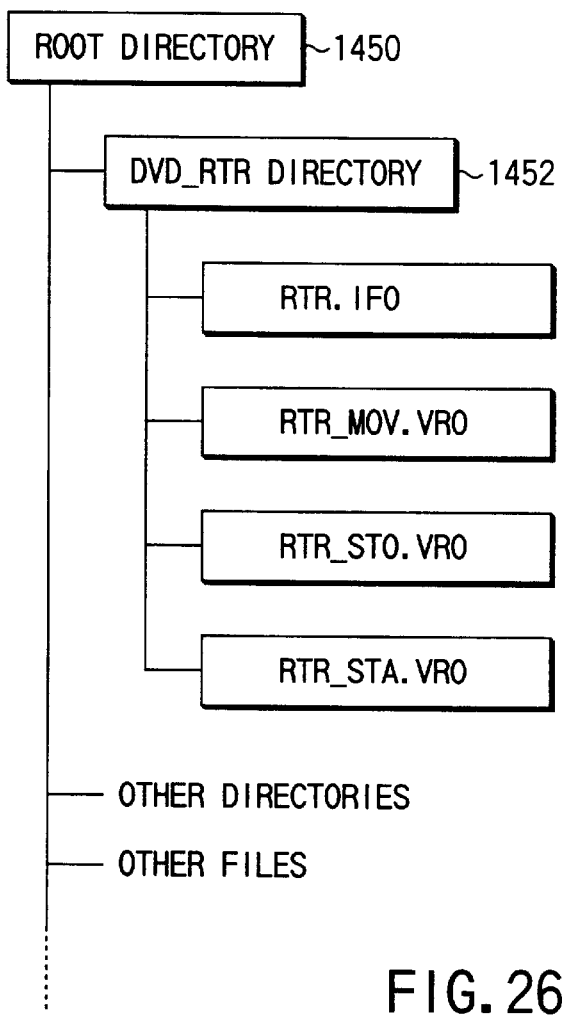
FIG. 26 is a view for explaining the directory structure of the optical disc having the data structure shown in FIG. 25.
FIG. 28 is a view showing the recording location of a video object on the optical disc.

All pieces of information recorded in data area 1004 in FIG. 25 are recorded in units of files, and the relationship between data files is managed by a directory structure, as shown in FIG. 26.

FIG. 39 illustrates the directory and files where the data which complies with this Specifications are recorded. All the files associated with the Program Set and Play Lists are Placed under DVD_RTR directory. Under the directory, the following files are created.

RTR.IFO

Navigation data to represent Programs Entry Points, Play Lists, and so on are recorded in this file. This file shall exists as long as any contents compliant to this Specifications are recorded. The Navigation data to be recorded in this file are to be described in the following sections.

RTR_MOV.VRO

Stream data categorized in Movie VOB are recorded in this file. Therefore as long as any Movie VOB exists, this file shall exist.

Control information 1011 in FIG. 25 is recorded as one file serving as recording/playback video management data. Control information 1011 in FIG. 25 has a file name "RTR.IFO" in FIG. 26. Video objects 1012 in FIG. 25 have a file name "RTR_MOV.VRO" in FIG. 26. Picture objects 1013 in FIG. 25 have a file name "RTR_STO.VRO" in FIG. 26. Audio objects in FIG. 25 have a file name "RTR_STA.VRO" in FIG. 26. RTRW_STA.VRO represents an after-recording file of a still picture (RTRW_STO.VRO). Video objects 1012, picture objects 1013, and audio objects 1014 are recorded as one AV file 1401 shown in FIG. 27.

<3> Data Structure in AV File

FIG. 27 shows a data structure in the AV file. As shown in FIG. 27, AV file 1401 constitutes program set (original PGC) 1402 as a whole. Program set 1402 consists of a set of a plurality of original cells=VOBs (video objects) 1403, 1404, and 1405 divided in accordance with the contents of audio & video data and the order of information recorded in AV file 1401.

VOBs 1403, 1404, and 1405 in FIG. 27 are defined as a set of audio & video data recorded in AV file 1401, and have definition contents different from those of video objects 1012 shown in FIG. 25 that substantially serve as classification items for video data, still picture information, audio data, and the like. Therefore, VOBs 1403, 1404, and 1405 in FIG. 27 record not only information classified into video objects 1012, but also information classified into picture objects 1013 and audio objects 1014.

Contents recorded in VOBs 1403, 1404, and 1405 are grouped in units of related VOBs, and respective groups are combined as PGs (programs) 1407 and 1408. That is, PGs 1407 and 1408 are constituted as sets of one or plurality of VOBs. In FIG. 27, PG 1408 is constituted by two VOBs 1404 and 1405, and PG 1407 is constituted by only one VOB.

The minimum basic units of video data are called VOBU 1411 to 1414, and data in VOBs 1403 to 1405 are constituted as sets of VOBUs (video object units) 1411 to 1414, as shown in FIG. 27. Video data compression using the VOB often employs MPEG1 or MPEG2. In MPEG, video data are grouped into GOPs every 0.5 sec, and compressed in units of GOPs. The video data compression unit of VOBUs 1411 to 1414 is formed in synchronism with the GOP with almost the same size as that of the GOP.

VOBUs 1411 to 1414 include one or more frames. More specifically, VOBUs 1411 to 1414 are divisionally recorded as 2,048 byte sectors 1431 to 1437. Each of sectors 1431 to 1437 is recorded with a pack structure format. In units of packs, raw video data, sub-video data, audio data, and dummy data are recorded in the forms of V_PCKs (Video Packs) 1421, 1425, 1426, and 1427, SP_PCK (Sub-picture Pack) 1422, A_PCK (Audio Pack) 1423, DM_PCK (Dummy Pack) 1424. Each pack has a 14 byte pack header at its beginning, and thus the information amount recorded in each pack is 2,034 bytes.

The recording area of a DVD-RAM disc as an example of optical disc 1001 shown in FIG. 25 is divided into a plurality of sectors. One sector can record 2,048 byte data. On this DVD-RAM disc, recording/playback is performed in units of sectors. When the DVD-RAM disc is used as optical disc 1001, respective packs are recorded in units of sectors 1431 to 1437, as shown in FIG. 27.

As shown in FIG. 27, a series of all VOBs 1403 to 1405 in AV file 1401 constitute program set 1402. An arbitrary range in an arbitrary VOB is designated and played back in an arbitrary playback order in accordance with a playback procedure programmed in original PGC information (ORG_PGCI) 1024 and user defined PGC information table (ORG_PGCI) 1025. The basic video data basic unit for playback will be called cells (user defined cells) 1441, 1442, and 1443. Cells 1441, 1442, and 1443 can designate an arbitrary range in an arbitrary VOB, but cannot designate a range over VOBs (one cell cannot set a range by linking a plurality of VOBs).

In FIG. 27, cell 1441 designates one VOBU 1412 in VOB 1403, cell 1442 designates one entire VOB 1404, and cell 1443 designates the range of only a specific pack (V_PCK 1427) in VOBU 1414.

Information representing the video data playback sequence is set by PGC (user defined program chain) 1446. This playback sequence is designated by one cell or described by link information between a plurality of cells. For example, in FIG. 27, PGC 1446 constitutes a playback program as a link between cells 1441, 1442, and 1443.

<4> Contents of Allocation Map Table

As described above, the recording area of the DVD-RAM disc is divided into a plurality of sectors, and the sectors are added with logical sector numbers (LSNs) in an ascending order from the inner side.

Assume that video data is recorded in data area 1004 of optical disc 1001 by the following procedure.

(1) A recording area of AV file 1401 is ensured in a continuous area (a<g) from LSNs a+1 to g in data area 1004 on optical disc 1001.

(2) Data of VOB#1 1461 is recorded in a continuous area (b<c) from LSNs b+1 to c in the recording area of AV file 1401.

(3) Data of VOB#2 1462 is recorded in a continuous area (d<e) from LSNs d+1 to e in the recording area of AV file 1401.

As a result of processes (1) to (3), three unrecorded areas from LSN "a+1 to b", "c+1 to d", and "e+1 to g" are left in AV file 1401. Video data of VOB#3 having a large data size is recorded in the unrecorded areas by the following procedure.

(4) Data of VOB#3 is divided into a plurality of segments in accordance with the unrecorded area size in the recording area of AV file 1401.

(5) The first data of the divided VOB#3 is recorded in a continuous area (a<b) from LSN a+1 to b.

(6) The second data of the divided VOB#3 is recorded in a continuous area (c<d) from LSN c+1 to d.

(7) The last data of the divided VOB#3 is recorded in a continuous area (f<g) from LSN f+1 to g.

Consequently, unrecorded area 1460 from LSN "e+1 to f" is left in AV file 1401. FIG. 28 shows the physical recording position distribution of respective VOBs in AV file 1401 that is obtained as a result of processes (1) to (7).

As is apparent from the above description, if data in AV file 1401 is partially erased, or new data is repetitively recorded in an unrecorded area of AV file 1401, one VOB data must be distributively recorded on a plurality of portions, like VOB#3 1463, 1464, and 1465.

Information representing the physical recording position distribution of respective data distributively recorded in units of VOBs in single AV file 1401 is allocation map table 1105 shown in FIG. 25. FIG. 29 shows the information contents of allocation map table 1105 for the data allocation in FIG. 28 used as an example. Allocation map table 1105 consists of unrecorded area position distribution information 1621, and data recording position distribution information 1622, 1623, and 1624 in units of VOBs.

A set in which a link between successive LSNs is assured in each VOB is defined as "extent". In FIG. 28, data of VOB#3 is separately recorded as three sets. In this example, since LSNs a+1 to b are linked as successive LSNS, this area constitutes "extent #γ 1473". That is, the position distribution where data of VOB#3 is recorded has tree extents #γ 1473, #δ 1474, and #ε 1475.

The number of extents 1601, 1602, 1603, and 1604 is recorded at the beginning of the unrecorded area and position distribution information about each VOB in allocation map table 1105 shown in FIG. 29. Subsequently, start addresses 1606, 1607, 1608, 1609, 1610, and 1611 and extent sizes 1614, 1615, 1616, 1617, 1618, and 1619 are recorded. The start address is expressed by a "difference number" from the first LSN in AV file 1401. By expressing the start address by the difference number, information in allocation map table 1105 need not be changed when the whole contents of AV file 1401 are transferred to another optical disc, resulting in high file transferability. In addition, as shown in FIG. 29, the extent size is expressed by the number of sectors. Instead of expressing the extent size as shown in FIG. 29, the extent size may be expressed by the final address of the extent.

In the DVD-RAM disc standard, a physical address on optical disc 1001 is called a physical sector number (PSN), and all addresses used in the file system are called logical sector numbers (LSNs), and an address defined on the file system in data area 1004 in FIG. 25 is called a logical block number (LBN). However, faithfully according to this description, an explanation becomes complicated. For this reason, in FIGS. 28 and 29, the address is expressed by the logical sector number for the sake of simplicity.

The data structure of RTRW video manager information (RTRW_VMGI) 1021 will be explained. RTRW video manager information (RTRW_VMGI) 1021 has, e.g., a data structure shown in FIG. 30, 31, or 32.

The data structure shown in FIG. 30 will be first explained. As shown in the upper stage in FIG. 30, RTRW video manager information (RTRW_VMGI) 1021 includes a video manager information management table (VMGI_MAT) and play list pointer table (PL_LPT). The video manager information management table (VMGI_MAT) includes a total of 512 byte data shown in the middle stage in FIG. 30. This 512 byte data includes REP_PICTI. REP_PICTI includes data shown in the lower stage in FIG. 30.

Specific data in FIG. 30 will be explained briefly.

(RBP 149 to 163)REP_PICTI

Describes disc Representative Picture Information as follows.

Note: Setting and using this Disc Representative Picture Information is an optional function for both Recorders and players. Recorders which don't have capability to handle this information may set 'FFH' to all 15 bytes of REP_PICTT. Players which don't have capability to handle this information may simple ignore this information.

(RBP 149)PGCN

Describes the PGC number in which this Disc Representative Picture exists. The Disc Representative Picture is specified as pointer in the original PGC. So, when this picture pointer exists, set '0' to PGCN.

(RBP 150)PGN

Describes the PG number in which this Disc Representative Picture exists.

(RBP 151 to 152)CN

Describes the Cell number in which this Disc Representative Picture exists.

(RBP 153 to 158)PICT_PT

Describes the Disc Representative Picture in the target Cell. When this picture exists in a Movie Cell, PICT_PT describes the Presentation Time (PTM). When this picture exists in a Still Picture Cell, PICT_PT describes the Still Picture VOB Entry number (S_VOB_ENTN) in the corresponding Still Picture VOB group (S_VOG) as follows.

The representative picture is extracted from these specific data. Instead, the VOB number may be used. The VOB number indicates a given VOB (VOB number) in the disc.

Figure 31:
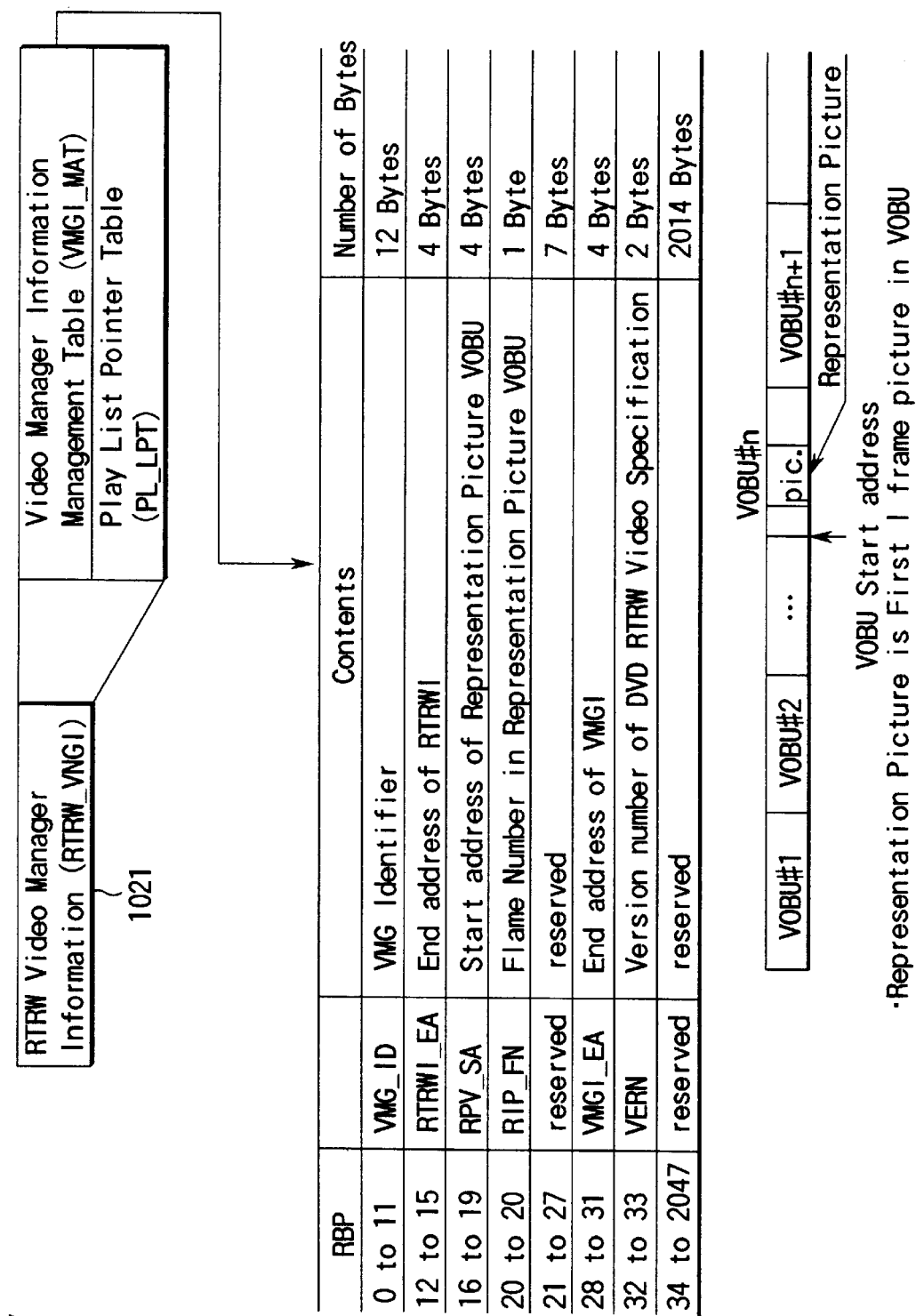
FIG. 31 is a view schematically showing example 2 of the data structure of RTRW video manager information.

The data structure shown in FIG. 31 will be explained. As shown in the upper stage in FIG. 31, RTRW video manager information (RTRW_VMGI) 1021 includes a video manager information management table (VMGI_MAT) and a play list pointer table (PL_LPT). As shown in the middle stage in FIG. 31, the video manager information management table (VMGI_MAT) includes a 12 byte (0 to 11) VMG identifier (VMG_ID), a 4 byte (12 to 15) end address of RTRWI (RTRWI_EA), a 4 byte (16 to 19) start address of representation picture VOBU (RPV_SA), a 1 byte (20 to 20) frame number in representation picture VOBU (RIP_FN), a 7 byte (21 to 27) reserved, a 4 byte (28 to 31) end address of VMGI (VMGI_EA), a 2 byte (32 to 33) version number of DVD RTRW video specification (VERN), and a 2,014 byte (34 to 2,047) reserved. A target representation picture (a representation picture is first I frame picture in VOBU) can be extracted from an address designated by the start address of representation picture VOBU (RPV_SA) and the flame number in representation picture VOBU (RIP_FN).

Figure 32:
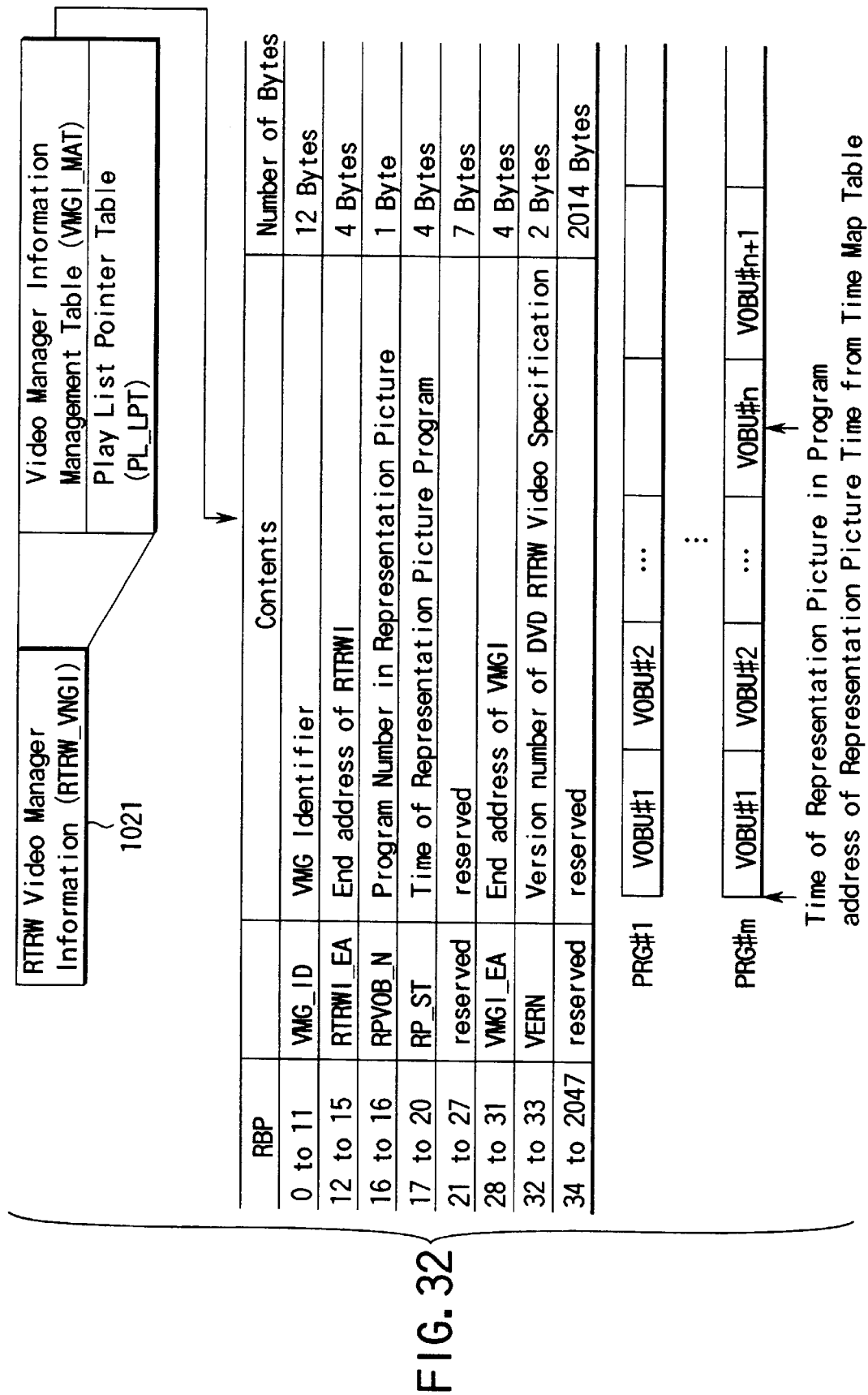
FIG. 32 is a view schematically showing example 3 of the data structure of RTRW video manager information.

The data structure shown in FIG. 32 will be explained. As shown in the upper stage in FIG. 32, RTRW video manager information (RTRW_VMGI) 1021 includes a video manager information table (VMGI_MAT) and a play list pointer table (PL_LPT). As shown in the middle stage in FIG. 32, the video manager information management table (VMGI_MAT) includes a 12 byte (0 to 11) VMG identifier (VMG_ID), a 4 byte (12 to 15) end address of RTRWI (RTRWI_EA), a 1 byte (16 to 16) program number in representative picture (RPVOB_N), a 4 byte (27 to 20) time of representative picture in program (RP_ST), a 7 byte (21 to 27) reserved, a 4 byte (28 to 31) end address of VMGI (VMGI_EA), a 2 byte (32 to 33) version number of DVD RTRW video specification (VERN), and a 2,014 byte (34 to 2,047) reserved. A target representative picture can be extracted from a time designated by the program number in representative picture (RPVOB_N) and the time of representative picture in program (RP_ST).

A target representative picture can be extracted from the above-described data. The extracted representative picture is directly printed on the disc or label, or displayed as a preview representing the recording contents of the disc. Printing is basically the same as described above with reference to FIG. 21.

<5> Contents of Original PGC Information (ORG_PGCI) 1024 and User Defined PGC Information Table (ORG_PGCI) 1025

Figure 33:
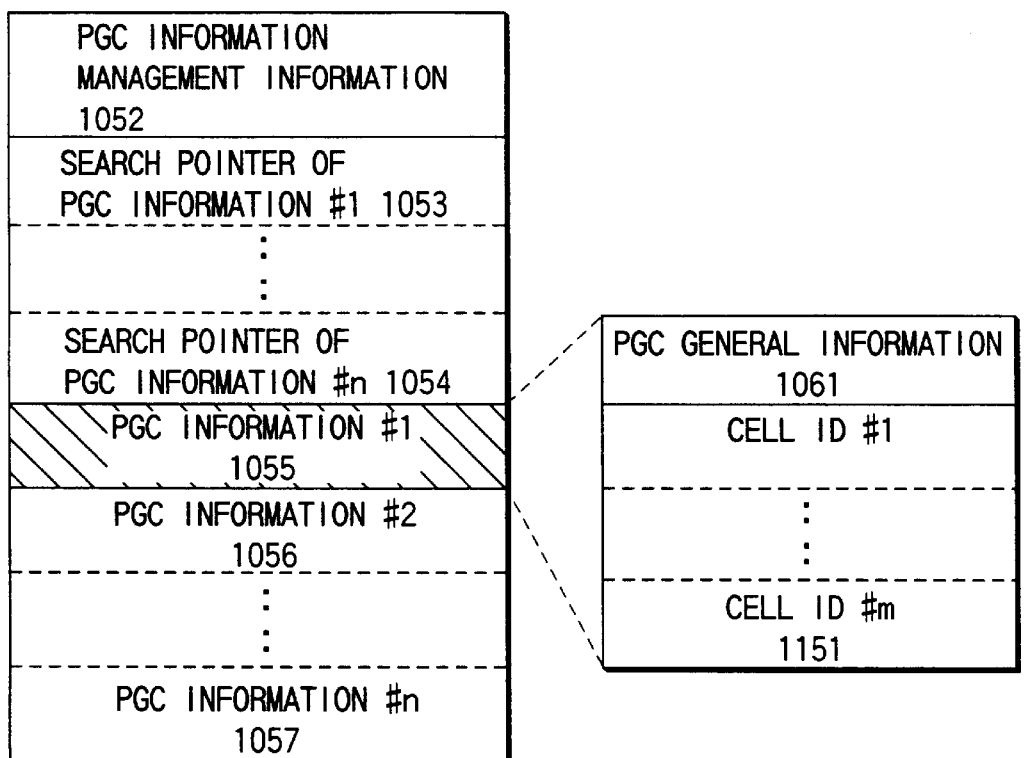
FIG. 33 is a view showing the schematic structure of data in PGC control information.

The contents of original PGC information (ORG_PGCI) 1024 and user defined PGC information table (ORG_PGCI) 1025 will be described with reference to FIGS. 33 and 34. PGC control information 1103 in original PGC information (ORG_PGCI) 1024 and user defined PGC information table (ORG_PGCI) 1025 has a data structure shown in FIG. 33, and the playback order is determined by the PGC and cell. The PGC is a unit for executing a series of playback processes which designate the playback order of cells. The cell is a playback section of playback data in each VOB that is designated by start and end addresses, as shown in FIG. 27.

PGC control information 1103 consists of PGC information management information 1052, one or more search pointers of PGC information 1053 and 1054, and PGC information 1055, 1056, and 1057.

PGC information management information 1052 includes number of PGC information indicating the number of PGCs. Each of search pointers of PGC information 1053 and 1054 points the beginning of each PGC information to facilitate search. Each of PGC information 1055, 1056, and 1057 consists of PGC general information 1061, and one or more cell playback information 1062 and 1063. PGC general information 1061 includes number of cell playback information serving as information indicating the PGC playback time and the number of cells.

Figure 34:
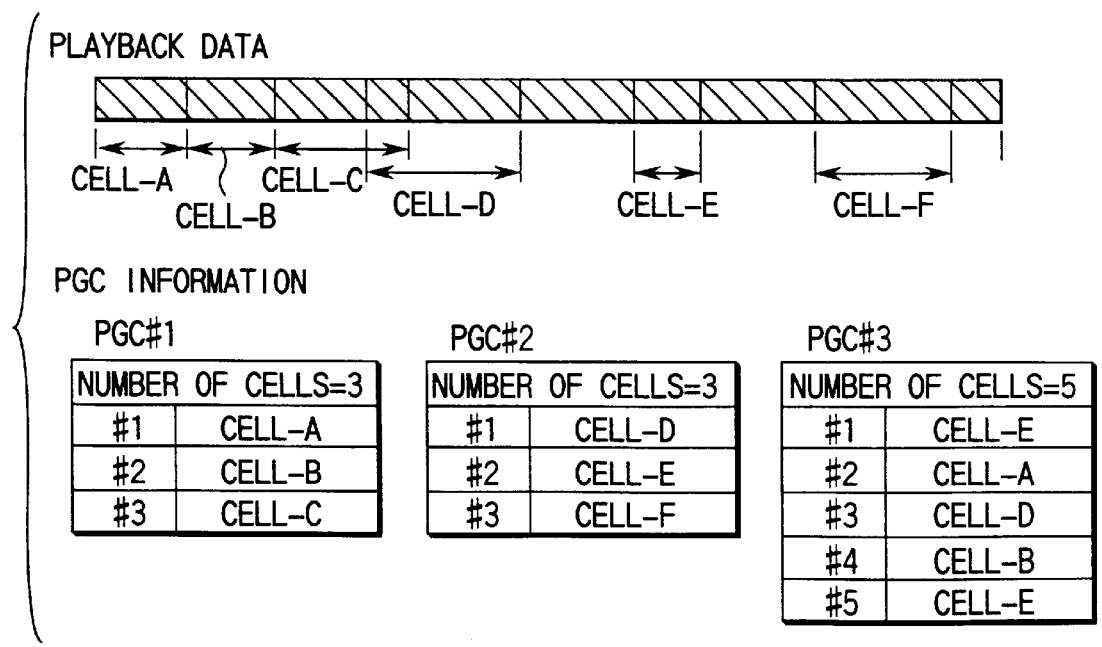
FIG. 34 is a view showing an example of playback of video data using PGC.

As shown in FIG. 34, playback data in the playback section from cell-A to cell-F is designated in units of cells, and PGC information is defined in each PGC.

(1) PGC#1 represents an example in which playback data consists of cells designating a continuous playback section, and the playback order is cell-A→cell-B→cell-C.

(2) PGC#2 represents an example in which playback data consists of cells designating a discontinuous playback section, and the playback order is cell-D→cell-E cell-F.

(3) PGC#3 represents an example in which playback data can be skippingly played back regardless of the playback direction and multiple playback, and the playback order is cell-E→cell-A→cell-D→cell-B→cell-E.

The aforementioned embodiment and modification have exemplified the RAM disc, but the present invention is not limited to this. For example, the present invention may be applied to the ROM disc. The above embodiment has exemplified the case in which the representative picture is a base picture (I picture), but the present invention is not limited to this. For example, the representative picture may be a picture based on change data representing a change (motion) in base picture.

Further, the above-described embodiment and modification have described the case in which the representative picture is printed based on representative picture data, but the present invention is not limited to this. For example, representative picture data may be stored in the memory (microcomputer block 30), and an icon may be generated from the stored representative picture data. The icon is generated by microcomputer block 30 and displayed on DVD video recorder display 48. In this manner, representative picture data can be used as a material for an icon.

What is claimed is:

1. An information reproducing method for reproducing a representative picture recorded on an information recording disc, said information recording disc including, a managing file in which management information is stored, and an audio file in which audio information is stored or a video file in which video information is stored, wherein, at least one object is recorded in said audio file or said video file, said at least one object including object units, each of said object units including at least one of a video pack in which video data is recorded or an audio pack in which audio data is recorded, said management information includes a plurality of program chain information including cell information representing cells, and a video manager information table as a first block including disc representative picture information for a disc representative picture, said video manager information table precedes said plurality of program chain information, at least one of said program chain information designates respective cell reproduction orders, said cells refer to a whole or a part of said at least one object, said disc representative picture information includes information regarding a program chain number, a cell number, a picture point as a presentation time of a picture representing recording contents of the disc, and information regarding a time when the disc representative picture was made, and said disc representative picture is any picture included in said at least one object, the information reproducing method comprising:

reading said management information;

referring to said disc representative picture information;

determining a position of said disc representative picture in said video file; and decoding said disc representation picture.

2. An information reproducing apparatus for reproducing a representative picture recorded on an information recording disc, said information recording disc including, a managing file in which management information is stored, and an audio file in which audio information is stored or a video file in which video information is stored, wherein, at least one object is recorded in said audio file or said video file, said at least one object including object units, each of said object units including at least one of a video pack in which video data is recorded or an audio pack in which audio data is recorded, said management information includes a plurality of program chain information including cell information representing cells, and a video manager information table as a first block including disc representative picture information for a disc representative picture, said video manager information table precedes said plurality of program chain information, at least one of said program chain information designates respective cell reproduction orders, said cells refer to a whole or a part of said at least one object, said disc representative picture information includes information regarding a program chain number, a cell number, a picture point as a presentation time of a picture representing recording contents of the disc, and information regarding a time when the disc representative picture was made, and said disc representative picture is any picture included in said at least one object, the information reproducing apparatus comprising:

a reproducer for reproducing said management information, for referring to said disc representative picture information, and for determining a position of said disc representative picture in said video file; and a decoder for decoding said disc representation picture.

3. An information recording method for recording a representative picture on an information recording disc, said information recording disc including, a managing file in which management information is stored, and an audio file in which audio information is stored or a video file in which video information is stored, wherein, at least one object is recorded in said audio file or said video file, said at least one object including object units, each of said object units including at least one of a video pack in which video data is recorded or an audio pack in which audio data is recorded, said management information includes a plurality of program chain information including cell information representing cells, and a video manager information table as a first block including disc representative picture information for a disc representative picture, said video manager information table precedes said plurality of program chain information, at least one of said program chain information designates respective cell reproduction orders, said cells refer to a whole or a part of said at least one object, said disc representative picture information includes information regarding a program chain number, a cell number, a picture point as a presentation time of a picture representing recording contents of the disc, and information regarding a time when the disc representative picture was made, and said disc representative picture is any picture included in said at least one object, the information recording method comprising:
determining a position of said disc representative picture in said video file;
generating said disc representative picture information; and
recording said management information including said disc representative picture information.

4. An information recording apparatus for recording a representative picture on an information recording disc, said information recording disc including, a managing file in which management information is stored, and an audio file in which audio information is stored or a video file in which video information is stored, wherein,
at least one object is recorded in said audio file or said video file, said at least one object including object units, each of said object units including at least one of a video pack in which video data is recorded or an audio pack in which audio data is recorded,
said management information includes a plurality of program chain information including cell information representing cells, and a video manager information table as a first block including disc representative picture information for a disc representative picture,
said video manager information table precedes said plurality of program chain information,
at least one of said program chain information designates respective cell reproduction orders, said cells refer to a whole or a part of said at least one object,
said disc representative picture information includes information regarding a program chain number, a cell number, a picture point as a presentation time of a picture representing recording contents of the disc, and information regarding a time when the disc representative picture was made, and
said disc representative picture is any picture included in said at least one object, the information recording apparatus comprising:
a first processor for determining a position of said disc representative picture in said video file, and for generating said disc representative picture information; and
a second processor for recording said management information including said disc representative picture information.

5. An information recording disc, comprising:

a recording area configured to store a managing file in which management information is stored, and an audio file in which audio information is stored or a video file in which video information is stored, the management information used to reproduce the audio or video information with a reproduction apparatus, wherein, said recording area includes at least one object recorded in said audio file or said video file, said at least one object including object units, each object unit including at least one of a video pack in which video data is recorded or an audio pack in which audio data is recorded, said management information includes,
a plurality of program chain information including cell information representing cells, and
a video manager information table as a first block including disc representative picture information for a disc representative picture, said video manager information table precedes said plurality of program chain information, at least one of said program chain information designates respective cell reproduction orders, said cells refer to a whole or a part of at least one object, said disc representatives picture information includes information regarding a program chain number, a cell number, a picture point as a presentation time of a picture representing recording contents of the disc, and information regarding a time when the disc representative picture was made, and said disc representative picture is any picture included in said at least one object.

* * * * *